US010828921B2

(12) United States Patent
Tsuchiya

(10) Patent No.: US 10,828,921 B2
(45) Date of Patent: Nov. 10, 2020

(54) LIQUID DISCHARGING APPARATUS, METHOD FOR DISCHARGING LIQUID, AND PROGRAM FOR DISCHARGING LIQUID

(71) Applicant: Yuki Tsuchiya, Kanagawa (JP)

(72) Inventor: Yuki Tsuchiya, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/697,966

(22) Filed: Nov. 27, 2019

(65) Prior Publication Data

US 2020/0171840 A1 Jun. 4, 2020

(30) Foreign Application Priority Data

Nov. 30, 2018 (JP) .................................. 2018-226138
Nov. 26, 2019 (JP) .................................. 2019-213272

(51) Int. Cl.
  *B41J 19/14* (2006.01)
  *G06K 15/10* (2006.01)
  *B41J 2/205* (2006.01)

(52) U.S. Cl.
  CPC ........... *B41J 19/142* (2013.01); *B41J 2/2054* (2013.01); *G06K 15/107* (2013.01)

(58) Field of Classification Search
  CPC ........ B41J 2/205; B41J 2/2054; B41J 2/2132; G06K 15/107; H04N 1/407
  See application file for complete search history.

(56) References Cited

U.S. PATENT DOCUMENTS

| 2006/0044338 | A1* | 3/2006 | Maru | G06K 15/107 347/15 |
| 2006/0284910 | A1* | 12/2006 | Aruga | B41J 2/2132 347/9 |
| 2007/0126789 | A1* | 6/2007 | Nishikori | G06K 15/107 347/40 |
| 2011/0273729 | A1* | 11/2011 | Tanase | G06K 15/107 358/1.8 |
| 2011/0316911 | A1* | 12/2011 | Ishikawa | G06K 15/102 347/9 |
| 2017/0100928 | A1* | 4/2017 | Namiki | B41J 2/2054 |

(Continued)

FOREIGN PATENT DOCUMENTS

| JP | 2010-274552 | 12/2010 |
| WO | 2016/152208 | 9/2016 |

*Primary Examiner* — Julian D Huffman
(74) *Attorney, Agent, or Firm* — IPUSA, PLLC

(57) ABSTRACT

A liquid discharging apparatus includes a head unit arranged in a main scanning direction includes head arrays each having nozzles discharging liquid are arranged in a sub scanning direction, a moving unit that alternately performs a main scanning operation while discharging the liquid and a sub scanning operation causing the head unit or the recording medium to move in the sub scanning direction without discharging the liquid, and a gradation setting unit that sets a first pattern setting a gradation to increase a center printing ratio at a center and decrease an end printing ratio at both ends for a whole area of the head array in the sub scanning direction and a second pattern in which a gradation is set so as to increase the printing ratio setting a gradation to increase the center printing ratio and decrease the end printing ratio for an arbitrary number of the heads.

10 Claims, 27 Drawing Sheets

(56) References Cited

U.S. PATENT DOCUMENTS

| | | | |
|---|---|---|---|
| 2017/0157919 A1* | 6/2017 | Katsuyama | B41J 2/2054 |
| 2017/0259597 A1* | 9/2017 | Hoshii | B41J 2/135 |
| 2019/0270316 A1 | 9/2019 | Tsuchiya | |
| 2020/0086653 A1* | 3/2020 | Katsuyama | B41J 2/2103 |

* cited by examiner

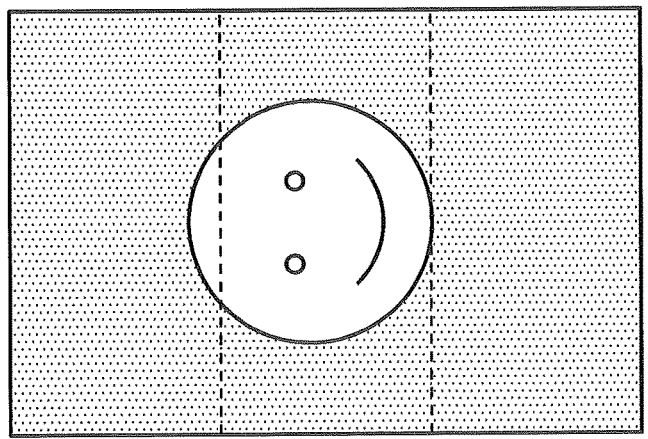
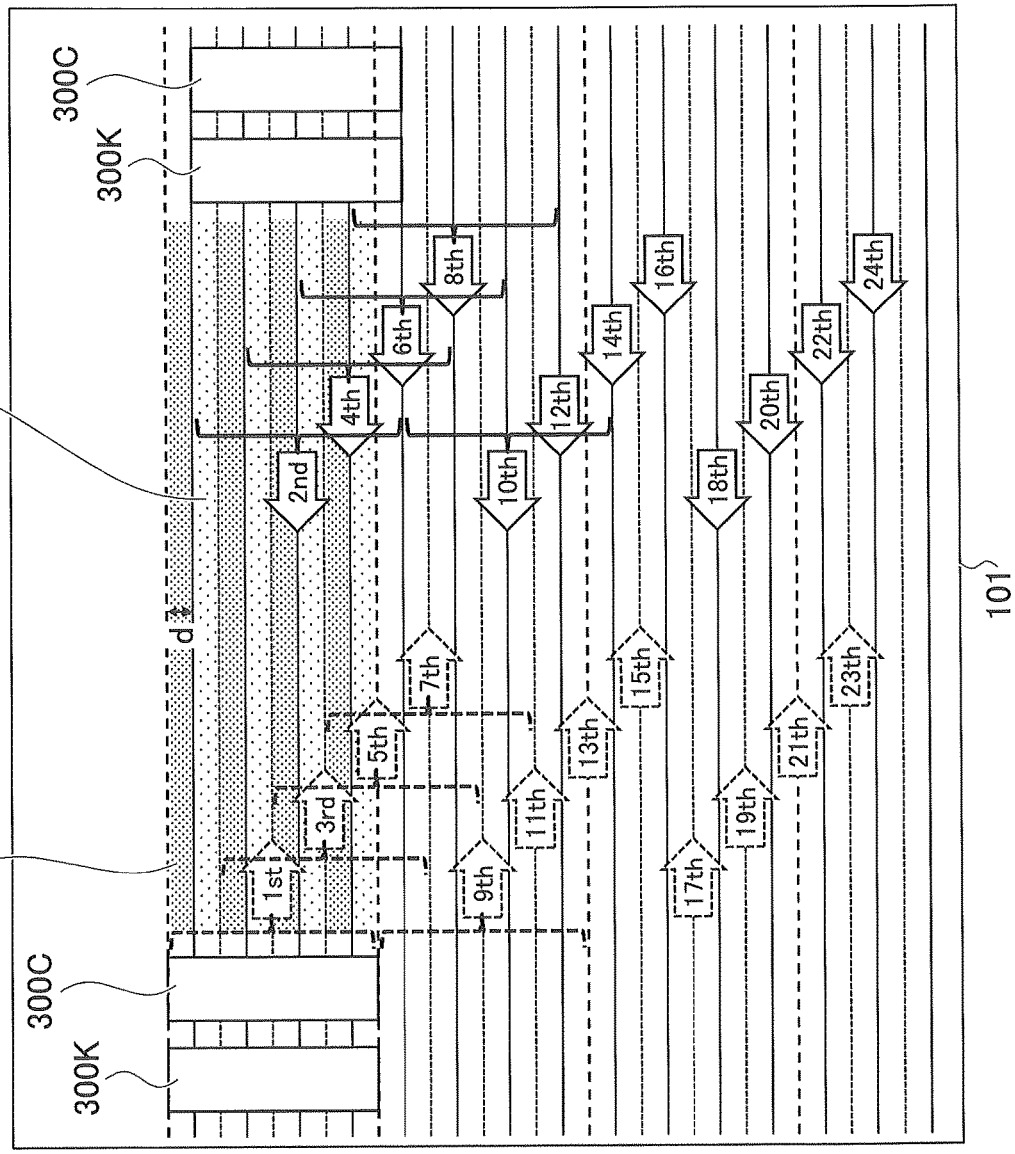
FIG.8

OVERALL FIGURE FILLED WITH BLACK COLOR

DOT SHAPE

R  B  G

BANDING

GREY  BLACK  GREY
(DARK)        (LIGHT)

LIQUID DISCHARGING APPARATUS, METHOD FOR DISCHARGING LIQUID, AND PROGRAM FOR DISCHARGING LIQUID

CROSS-REFERENCE TO RELATED APPLICATION

The present application claims priority under 35 U.S.C § 119 to Japanese Patent Application No. 2018-226138, filed Nov. 30, 2018 and Japanese Patent Application No. 2019-213272, filed Nov. 26, 2019, the contents of which are incorporated herein by reference in their entirety.

BACKGROUND OF THE INVENTION

1. Field of the Invention

The present invention relates to a liquid discharging apparatus, a method for discharging liquid, and a program for discharging liquid.

2. Description of the Related Art

An ink jet recording apparatus is known in which a plurality of nozzles for discharging ink are arranged and the recording head and the recording medium are moved relative to each other to discharge ink and form an image thereon.

Here, in a case where the ink jet image forming apparatus having the head array in which a plurality of short recording heads is staggered in the nozzle row direction (the sub scanning direction), in the joint area in which a plurality of recording heads overlap in the sub scanning direction, dots are discharged more than the other parts, resulting in density irregularity.

Accordingly, Patent Document 1 discloses a structure for reducing the usage rate at the end of the recording head corresponding to the joint area between the recording heads for the purpose of eliminating density irregularities in each joint image.

[Patent Document 1] International Publication 2016/152208

In particular, FIG. 1 illustrates a schematic diagram illustrating a position where the output of pixels is performed by the nozzle 922 in accordance with the thinned image data in each of a plurality of main scanning operations according to the Patent Document 1 and a distribution of the print image rate.

The left column of FIG. 1 illustrates the relative position of the head unit 920 in the sub scanning direction in each of two consecutive main scanning operations. The center illustrates the output pattern 980 representing the position at which the output of the pixel is performed by the nozzle 922 of the nozzle array group 924 in each of the main scanning operations from the head unit 920 illustrated in the left column. The right column illustrates the distribution of the imprinted image rate at each position in the sub scanning direction on the recording medium in each of the main scanning operations. In the present technique, the central portion of each nozzle array 923 has a 100% printing rate, the joint of the nozzle array 923 and the two end portions of the nozzle array group 924 have a 0% printing rate, and the printing rate varies linearly therebetween.

However, in the above-described technique of Patent Document 1, irregularity in density of the recorded image is reduced. However, when bi-directional printing is performed, due to the difference in the order of overlap of the colors of dots, the boundary between the runway area and the return area arises. Such boundaries occur in a band along the scanning direction of the head, resulting in banding of the recorded image, which is so-called glossy.

The gloss banding described above also occurs in overlapping regions in multiple scans when forming an image larger than the length of the head, as well as in the joint of nozzle rows.

SUMMARY OF THE INVENTION

One aspect of this disclosure provides a liquid discharging apparatus including a head unit arranged in a main scanning direction includes head arrays each having nozzles discharging liquid are arranged in a sub scanning direction, a moving unit that alternately performs a main scanning operation while discharging the liquid and a sub scanning operation causing the head unit or the recording medium to move in the sub scanning direction without discharging the liquid, and a gradation setting unit that sets a first pattern setting a gradation to increase a center printing ratio at a center and decrease an end printing ratio at both ends for a whole area of the head array in the sub scanning direction and a second pattern in which a gradation is set so as to increase the printing ratio setting a gradation to increase the center printing ratio and decrease the end printing ratio for an arbitrary number of the heads.

BRIEF DESCRIPTION OF THE DRAWINGS

FIG. 8 is a diagram illustrating a mechanism in which a gloss banding is generated in a multi-pass interlace;

DETAILED DESCRIPTION OF THE EMBODIMENTS

Figure 1:
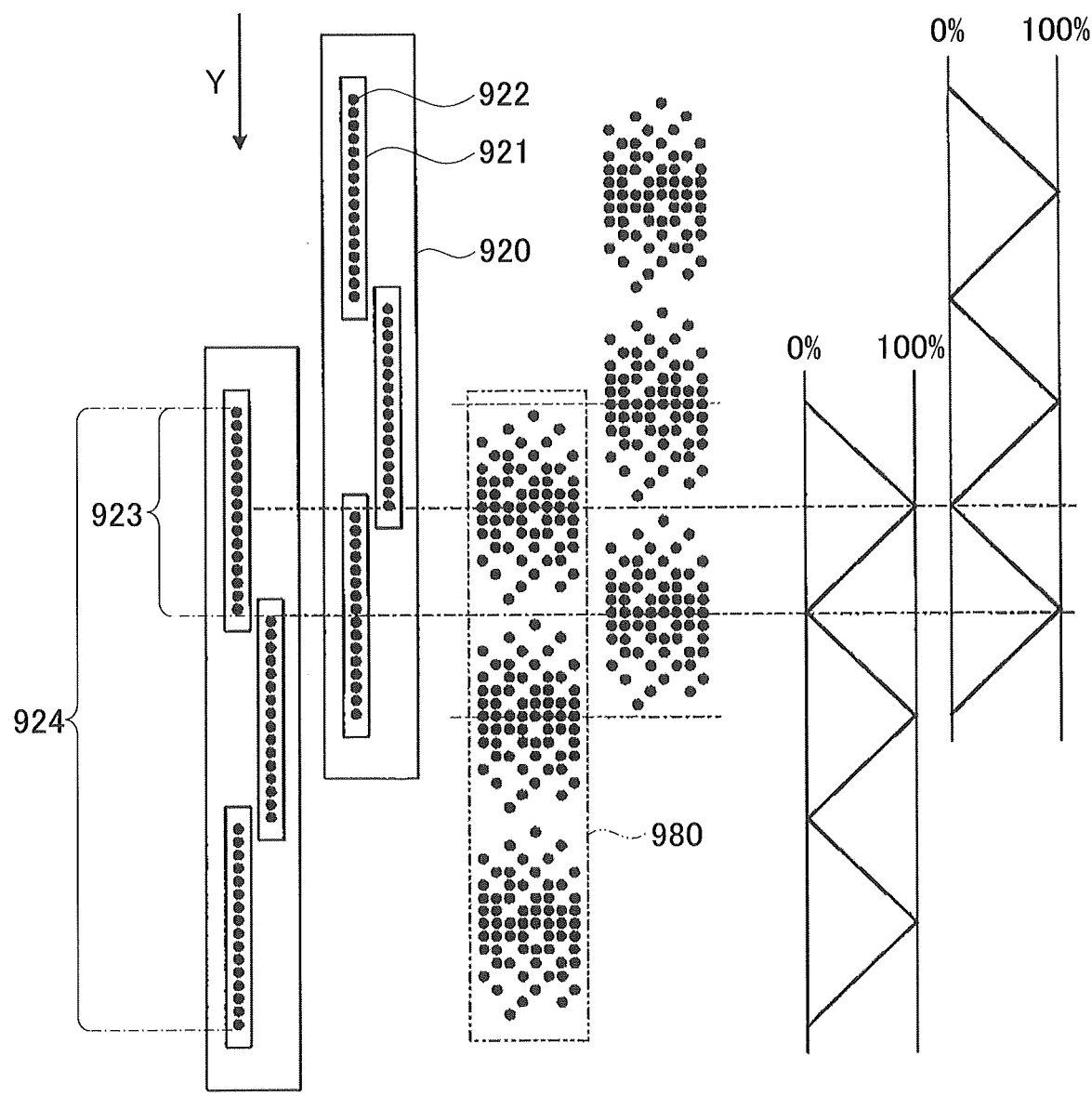
FIG. 1 is a schematic view illustrating a gradation mask according to a conventional embodiment.

Hereinafter, an embodiment for carrying out the present invention will be described with reference to the drawings. In the following drawings, the same components are indicated by the same reference numerals, and overlapping descriptions may be omitted.

First Embodiment

First, a plurality of embodiments of the image forming apparatus that is an example of the liquid discharge apparatus according to the present invention will be described with reference to the overall configuration.

Figure 2:
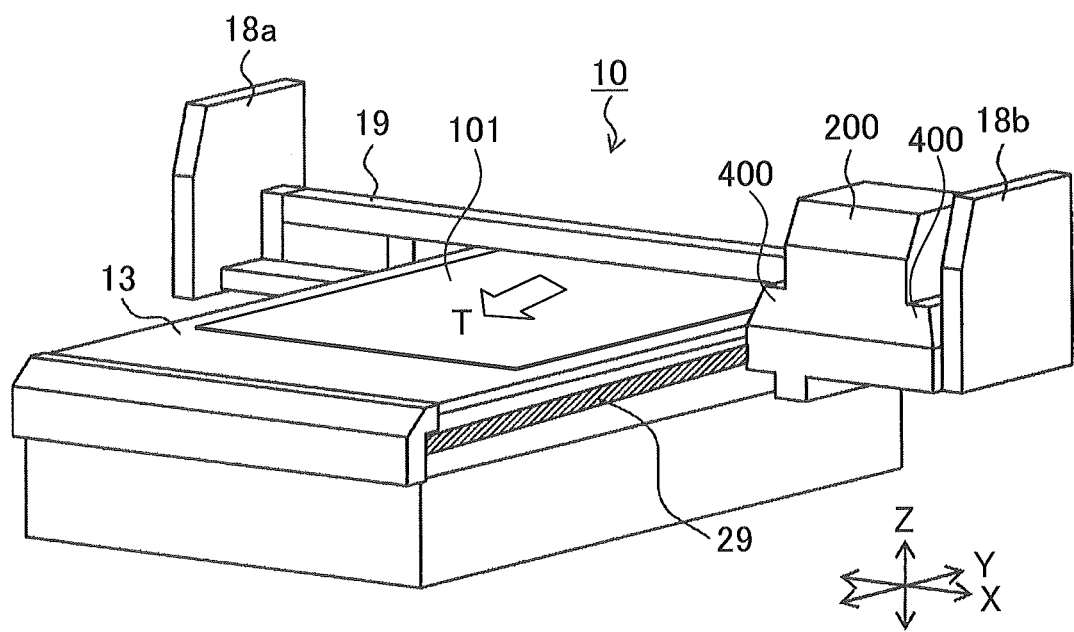
FIG. 2 is a perspective view illustrating an overall configuration of an example of an image forming apparatus according to a first embodiment of the invention.

FIG. 2 is a perspective view illustrating an overall configuration of an inkjet recording apparatus as an image forming apparatus according to the first embodiment of the present invention.

The ink jet recording apparatus 10 includes a carriage 200 and a stage 13 on which a recording medium is placed. The carriage 200 is provided with the head unit 300, which is an ink jet type image forming unit including a plurality of liquid discharge heads having a plurality of nozzles. The image is formed by discharging liquid from the nozzle N (see FIG. 11) of the recording head (a recording head). A nozzle is provided on the opposite side of the stage 13. In this embodiment, the liquid is, as an example, an ink having ultraviolet curable properties.

An emitting unit 400, which is a light source for irradiating ultraviolet light, is provided on the opposite side of the carriage 200 with respect to the stage 13. The emitting unit 400 (an example of an emitting portion) emits light of a wavelength that cures the liquid discharged from the nozzle N.

A guide rod 19 is provided on the left and right side plates 18a and 18b, and the guide rods 19 holds the carriage 200 in the X direction (the main scanning direction X).

The carriage 200, the guide rod 19, and the side plates 18a and 18b are integrally moved in the Y direction (the sub scanning direction) along the guide rail 29 provided in the lower portion of the stage 13. Further, the carriage 200 is movably held in the Z direction (up and down).

In the configuration illustrated in FIG. 2, the stage 13, in which the recording medium, is mounted is fixed. In the ink jet recording apparatus illustrated in FIG. 2, a main scanning operation in which ink is discharged from the nozzle N onto the recording medium while the recording head is moved in the main scanning direction and a sub scanning operation in which the recording head is moved in the sub scanning direction are repeated alternately to form an image.

Accordingly, in this embodiment, the carriage 200 and the guide rod 19 are movement portions in a main scanning direction (an X direction, a second direction), and the carriage 200 and the guide rail 29 function as movement portions in a sub scanning direction (a Y direction, a first direction).

Second Embodiment

Figure 3:
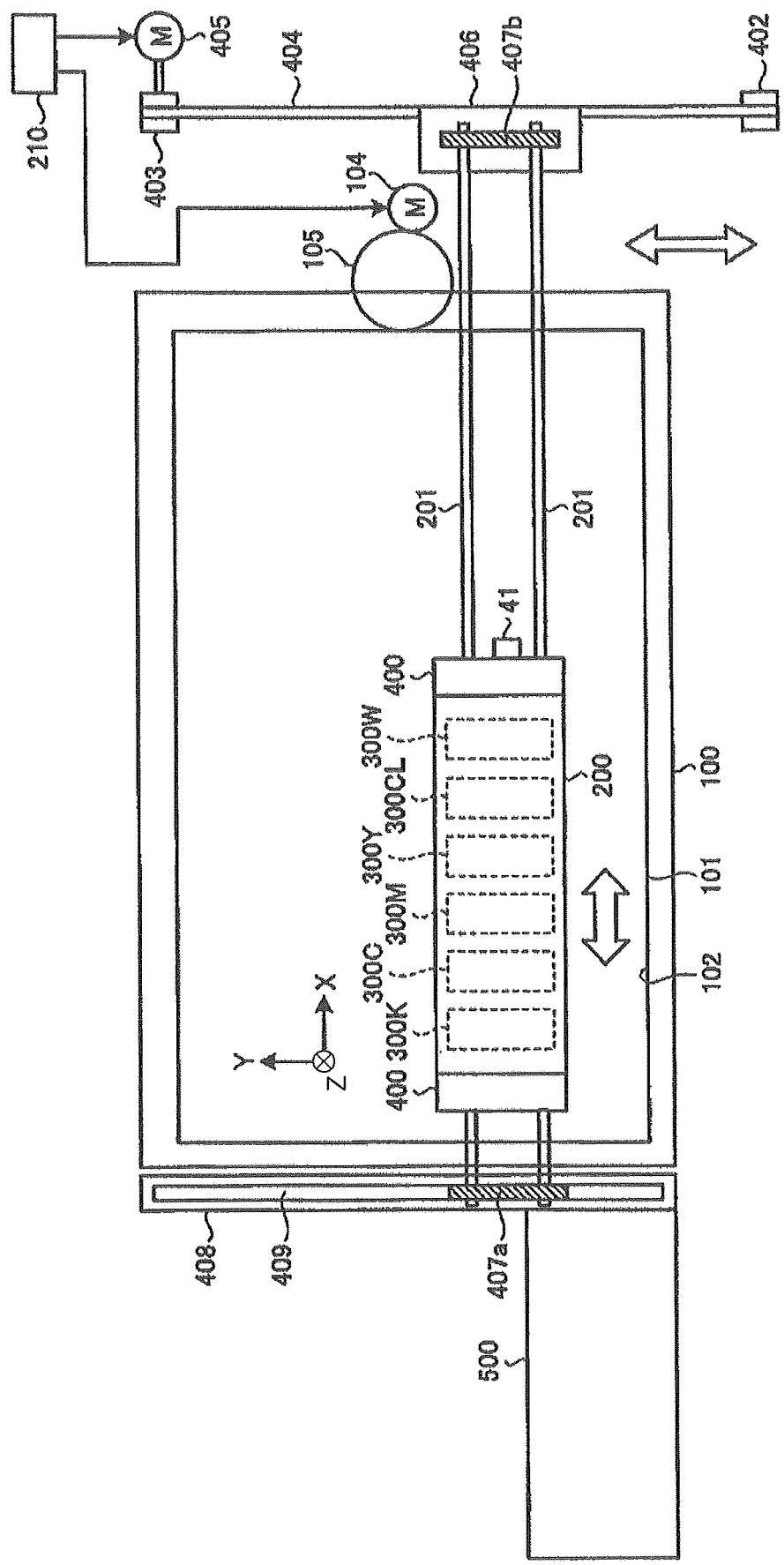
FIG. 3 is a plan view illustrating the periphery of an image forming unit of the image forming apparatus according to a second embodiment of the invention.
Figure 4:
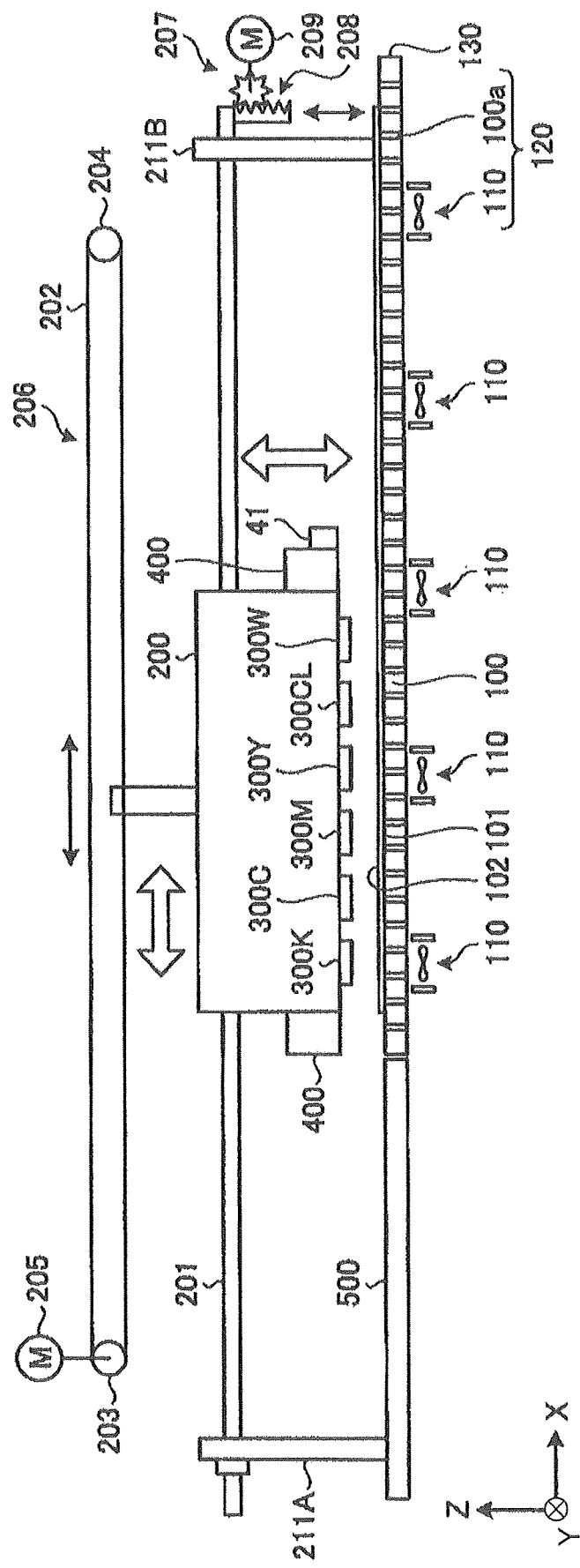
FIG. 4 is a front view around an image forming unit of the image forming apparatus illustrated in FIG. 3.

FIG. 3 is a schematic view illustrating an example of a front view of an ink jet recording apparatus 1 that is an image forming apparatus (liquid discharge apparatus) according to a second embodiment of the present invention, and FIG. 4 is a schematic diagram illustrating an example of a plan view of the inkjet recording apparatus 1 according to the present embodiment.

In the configuration of FIGS. 2 and 3, the stage 230 on which the recording medium 101 is mounted is movable. In the ink jet recording apparatus 1 illustrated in FIGS. 2 and 3, in the sub scanning operation, the recording medium is moved in the sub scanning direction with respect to the recording head. Although FIG. 3 illustrates an example in which one head is provided in one head array, a plurality of heads may be provided in the sub scanning direction in one head array (see FIG. 10).

Next, an example of a hardware configuration in an image forming system including an image forming apparatus (ink jet recording apparatus 10 and 1) will be described.

Figure 5:
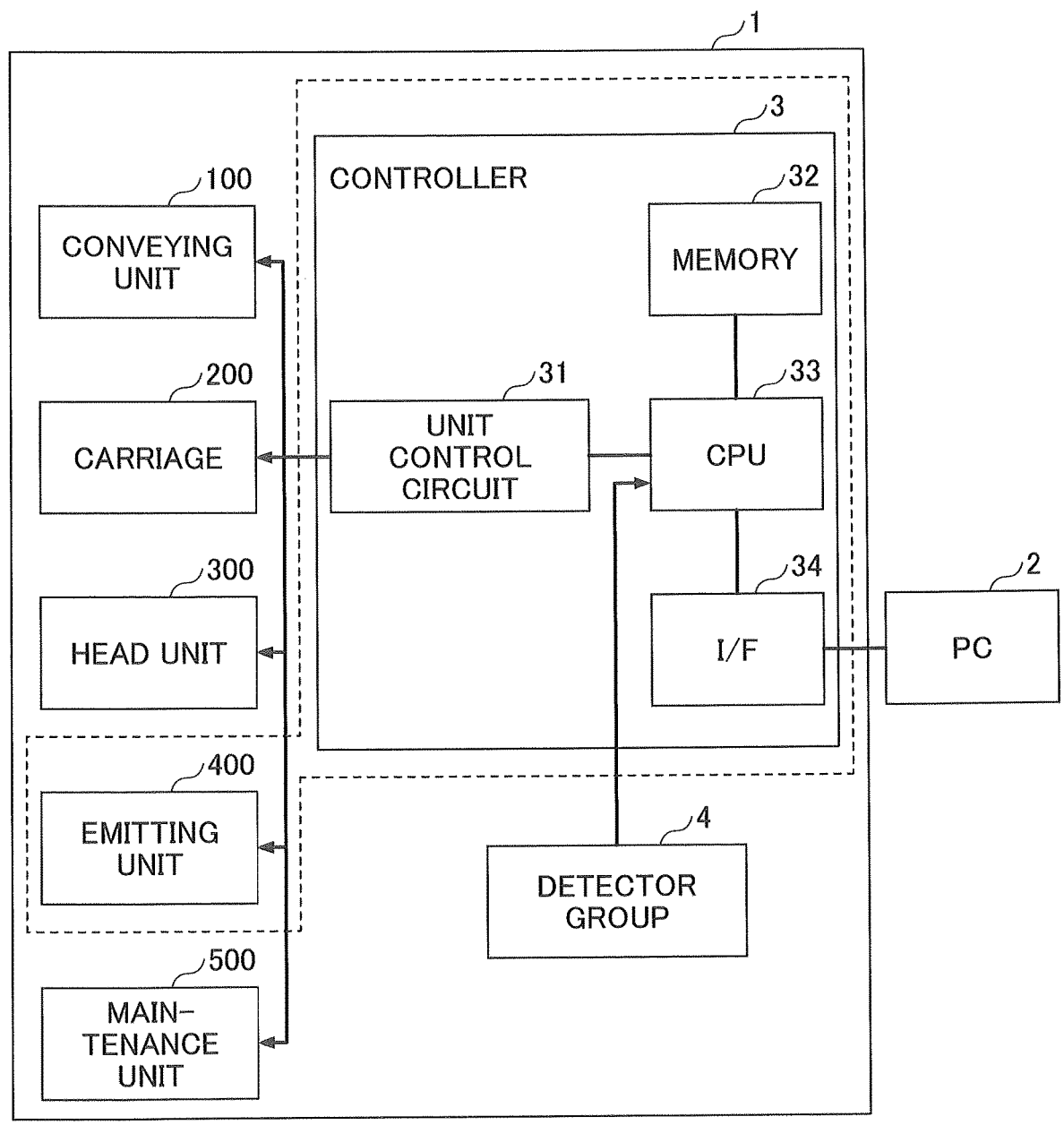
FIG. 5 is a block diagram illustrating a hardware configuration of an example of the image forming apparatus according to the present invention.

FIG. 5 is a block diagram illustrating an example of the hardware configuration of the image forming system according to the present embodiment. In the system illustrated in FIG. 5, as illustrated in FIGS. 2 to 4, in the image forming system, the PC 2, which is an external device, is connected to the image forming apparatus (the ink jet recording apparatus 10 and 1) that forms an image by the mechanical structure, and the PC2 performs image processing. The function related to the image processing executed by the PC2 may be disposed inside the image forming apparatus.

As illustrated in FIG. 5, the image forming apparatus 30 (ink jet recording apparatus 1 and 10) according to the present embodiment includes a controller unit 3, a detector unit 4, a conveying unit 100 that is a conveying unit, a carriage 200, a head unit 300 (an example of a liquid discharge head), an irradiating unit 400 (an example of an irradiating unit), and a maintenance unit 500.

The controller unit 3 includes a unit control circuit 31, a memory 32, a central processing unit (CPU) 33, and an I/F 34. As illustrated by the dashed line in FIG. 4, the curing device may include at least the controller unit 3 and the emitting unit 400.

The I/F 34 is an interface for connecting the image forming apparatus 30 (1, 10) to the external PC (personal computer) 2. The image forming apparatus 30, 10 and the PC2 may have any form of connection, for example, a form in which both are directly connected through a network or through a communication cable.

The detector unit 4 includes various sensors provided in the ink jet recording apparatus 1, such as the height sensor 41 illustrated in FIGS. 3 and 4.

The CPU 33 uses the memory 32 in the working area to control the operation of each unit of the ink jet recording apparatus 1 through the unit control circuit 31. Specifically, the CPU 33 controls the operation of each unit based on the recording data received from the PC2 and the data detected by the detector unit 4 to form an image on the recording medium 101 (also referred to as a substrate or the like) that is a liquid coating surface 102.

A printer driver is installed in the PC2, and recorded data transmitted to the inkjet recording apparatus 1 is generated from the image data by the printer driver. The recording data includes command data for operating the conveying unit 100 or the like of the ink jet recording apparatus 1 and pixel data relating to an image (a liquid coating surface 102). Pixel data consist of 2 bits of data per pixel and is represented by a 4-step gradation.

Next, members in a mechanical structure of the image forming apparatus will be described with reference to FIGS. 2 to 5. The conveying unit 100 includes a stage 130 and a suction mechanism 120. The suction mechanism 120 includes a plurality of adsorption holes 100a provided in the fan 110 and the stage 130. The suction mechanism 120 temporarily secures the recording medium 101 to the transport unit 100 by driving the fan 110 to adsorb the recording medium 101 from the adsorption hole 100a. The suction mechanism 120 may use electrostatic adsorption to adsorb the paper. The conveying unit 100 moves in the Y-axis direction (the sub scanning direction) based on a drive signal from the CPU 33 (the unit control circuit 31).

In the configuration illustrated in FIGS. 3 and 4, the conveying unit 100 includes a transfer control unit 210, a roller 105, and a motor 104. The transfer control unit 210 moves the recording medium 101 in the Y-axis direction (the sub scanning direction) by driving the motor 104 and rotating the roller 105.

The conveying unit 100 may move the carriage 200 in the Y-axis direction (the sub scanning direction) instead of the recording medium 101 as illustrated in FIG. 2. That is, the conveying unit 100 moves the recording medium 101 and the carriage 200 relatively in the Y-axis direction (the sub scanning direction).

For example, as illustrated on the right side of FIG. 4, the conveying unit 100 includes a side plate 407b for supporting two guides 201 for guiding the carriage 200 in the X-axis direction (the main scanning direction), a pedestal 406 for supporting the sideplate 407b, a belt 404 fixed to the base 406, a drive pulley 403 and a driven pulley 402 on which the belt 404 is turned, a motor 405 for rotationally driving the drive pulley 403, and a transport control 210.

The conveying unit 100 further includes a side plate 407a for supporting two guides 201 for guiding the carriage 200 in the X-axis direction (the main scanning direction X), a pedestal 408 for supporting the side plate 407a in a slideable manner, and a groove 409 for forming the side plate 407a on the base 408 and guiding the side plate 407a in the sub scanning direction, as illustrated on the left side of FIG. 4.

The conveying unit 100 drives the motor 405 in the transfer control unit 210 to rotate the drive pulley 403 and move the belt 404 in the Y-axis direction (the sub scanning direction). When the pedestal 406 on which the carriage 200 is supported moves in the Y-axis direction (the sub scanning direction) along with the movement of the belt 404, the carriage 200 can be moved in the Y-axis direction (the sub scanning direction). As the side plate 407a moves in the Y-axis direction (the sub scanning direction) of the pedestal 406, it moves in the Y-axis direction (the sub scanning direction) along the groove 409 of the pedestal 408.

In the embodiment illustrated in FIGS. 2 and 3, the carriage 200, the base 406, the belt 404, the drive pulley 403, the driven pulley 402, and the rotationally driven motor 405 are moving parts in the main scanning direction (X direction, second direction). Further, the conveying unit 100, such as the stage 130, the roller 105, and the motor 104, functions as a moving unit in the sub scanning direction (the Y direction and the first direction).

As illustrated in FIGS. 3 to 4, the head unit 300 is composed of head arrays 300K, 300C, 300M, 300Y, 300CL, and 300W for discharging K, C, M, Y, CL, and W UV-curable inks (an example of a liquid), respectively, and is mounted on the lower surface of the carriage 200.

Each head array 300K-300W is provided with one or more heads. If the heads are composed of multiple heads, the multiple heads may be staggered or arranged in a row.

Each head includes a piezo that is a driving element, and when a driving signal is applied to the piezo by the CPU 33 (unit control circuit 31), the piezo causes a contraction movement and causes a pressure change caused by the contraction movement, thereby discharging a UV curable ink onto the recording medium 101. Thus, a liquid coating surface 102 (an example of a liquid coating surface) is formed on the recording medium 101.

Suitable UV curable inks for this embodiment include, for example, inks containing methacrylate-based monomers. Methacrylate monomers have the advantage of relatively low skin sensitivity, but they have the property of greater degree of curing contraction than conventional inks.

The illumination unit 400 is provided on the side (X-axis plane) of the carriage 200 and irradiates UV light based on a drive signal from the CPU 33 (unit control circuit 31). The illumination unit 400 is comprised primarily of UV illumination lamps that illuminate UV light.

The carriage 200 moves in the Z-axis direction (the height direction) and the X-axis direction (the main scanning direction) based on the driving signals from the CPU 33 (the unit control circuit 31).

The carriage 200 scans along the guide 201 in the main scanning direction (the X-axis direction). The scanning portion 206 includes a drive pulley 203, a driven pulley 204, a drive belt 202, and a motor 205. The carriage 200 is secured to a drive belt 202 which is hung between the drive pulley 203 and the drive pulley 204. Driving the drive belt 202 with a motor 205 causes the carriage 200 to scan laterally in the main scanning direction. The guide 201 is supported on side plates 211A and 211B of the apparatus body.

The height adjusting unit 207 includes a motor 209 and a slider 208. The height adjusting unit 207 moves the motor 209 up and down to raise and lower the guide 201. As the guide 201 moves up and down, the carriage 200 moves up and down to adjust the height of the carriage 200 relative to the recording medium 101.

<Image Forming Operation>

Hereinafter, an image forming operation of the ink jet recording apparatus 1 illustrated in FIG. 2 will be described. First, the conveying unit 100 moves in the Y-axis direction (the sub scanning direction) based on the driving signal from the CPU 33 (the unit control circuit 31) to position the recording medium 101 at the initial position for forming an image (the liquid coating surface 102).

Subsequently, based on the driving signal from the CPU 33 (unit control circuit 31), the carriage 200 moves to a height suitable for discharge of the UV-curable ink by the head unit 300 (for example, a height in which the gap between the lower surface of each head and the head of the recording medium 101 becomes 1 mm in the head array 300K to W of the head unit 300). The height of the head unit 300 is detected by the height sensor 41, and is caught by the CPU 33.

Subsequently, the carriage 200 reciprocates in the X-axis direction (the main scanning direction) based on the driving signal from the CPU 33 (the unit control circuit 31), and upon reciprocating movement, the head unit 300 discharges the UV-curable ink based on the driving signal from the CPU 33 (the unit control circuit 31). Accordingly, an image (liquid coating surface 102) corresponding to one scan is formed on the recording medium 101.

Subsequently, when an image (liquid coating surface 102) equivalent to one scan is formed on the recording medium 101, the conveying unit 100 moves in the Y-axis direction (sub scanning direction) for one scan based on the driving signal from the CPU 33 (unit control circuit 31).

Hereinafter, until the formation of the image (the liquid coating surface 102) is completed, the operation of forming the image (the liquid coating surface 102) for one scan and the operation of moving the conveying unit 100 in the Y-axis direction for one scan are alternately performed.

When the image (liquid coating surface 102) is formed on the recording medium 101, the UV curable ink is waited for a time (hereinafter, sometimes referred to as "leveling time") to be smoothed, after which the UV light by the emitting unit 400 is irradiated.

Function Block of First Embodiment

Next, a function block of the present invention will be described.

Figure 6:
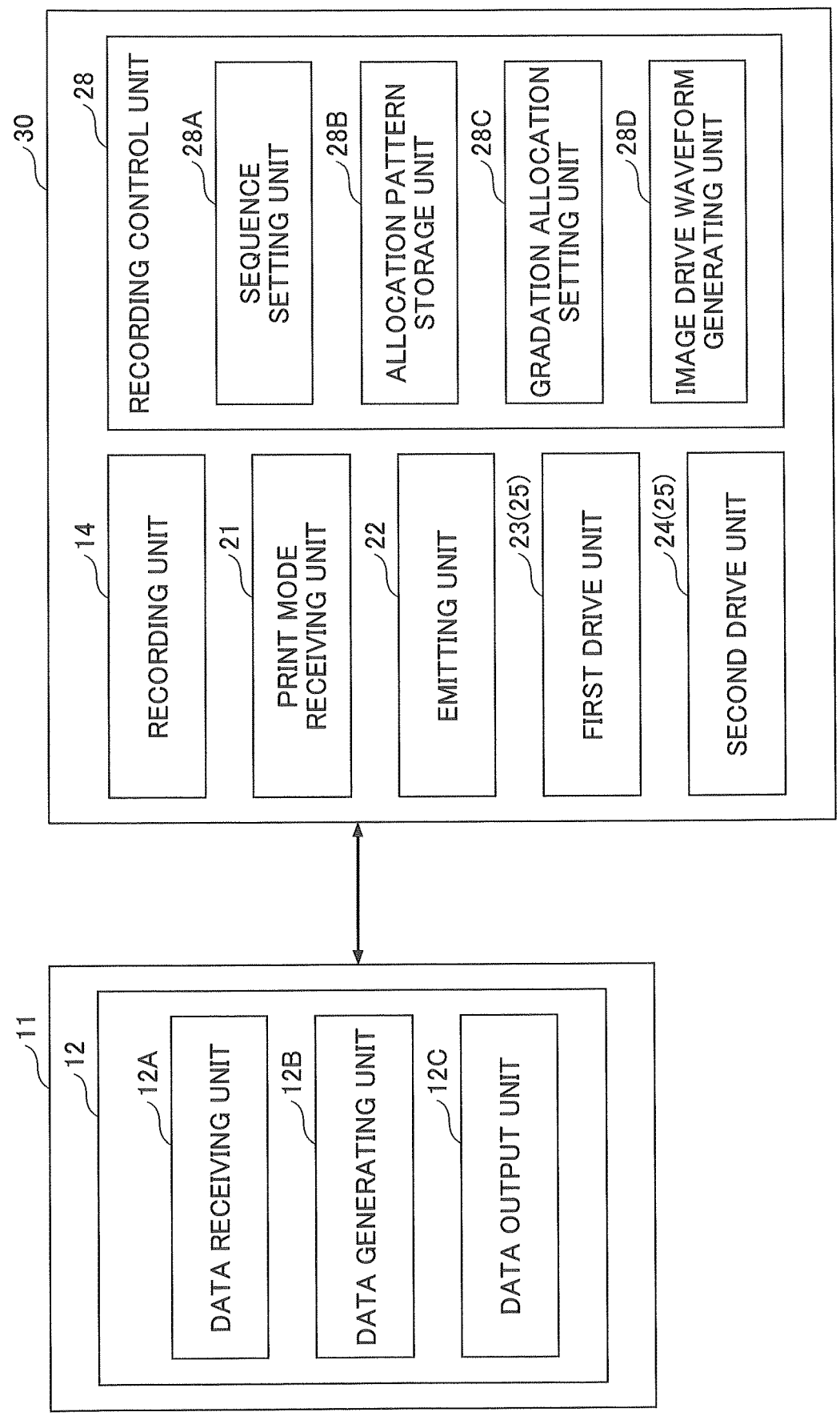
FIG. 6 is a functional block diagram of a control unit related to image processing of an image forming apparatus according to a first embodiment of the invention.

FIG. 6 is a functional block diagram illustrating image processing in an image forming system according to the first embodiment of the invention.

The image processing apparatus 11 includes a main control unit 12. The main control unit 12 is a computer including a CPU or the like and controls the entire image processing apparatus 11. The main control unit 12 may be configured by other than a general purpose CPU. For example, the main control unit 12 may be configured by a circuit or the like.

As illustrated in FIG. 6, the image processing apparatus 11 may be implemented by the PC2 connected to the image forming apparatus 30 or may be disposed inside the image forming apparatus 30.

The main control unit 12 includes a data receiving unit 12A, a data generating unit 12B, and a data output unit 12C. The data receiving unit 12A, the data generating unit 12B, and the data output unit 12C may be implemented in software for executing a program in a processing device such as a CPU, implemented in hardware such as an IC (integrated circuit), or implemented in a combination of software and hardware.

The data receiving unit 12A receives the image data. The image data is information such as the shape and color of the image to be formed.

The data receiving unit 12A may acquire image data from an external device through the communication unit or may acquire image data from a storage unit provided in the image processing apparatus 11.

The data generating unit 12B performs predetermined data processing, such as mask processing, on the image data received by the data receiving unit 12A. In this embodiment, image data (e.g., JPEG image data), color ink image data, and image data for clear ink are created based on the desired gloss.

The data output unit 12C outputs the image data produced by the data generating unit 12B to the image forming apparatus 30.

The image forming apparatus 30 (1) includes a recording unit 14, a printing mode receiving unit 21, an irradiating unit 22, a driving unit 25 (23 and 24), and a recording control unit 28.

The recording unit 14 is a head drive unit that drives droplet discharge of each head of the head array 300K to 300W based on image data controlled by the recording control unit 26.

The driving portion 25 drives a moving unit. The first driving portion 23 drives the movement of the carriage 200 in the X direction during scanning. The second driving portion 24 drives the movement of the carriage 200 or the recording medium 101 in the sub scanning direction during sub scanning.

The recording control unit 28 receives print data from the image processing apparatus 11. The recording control unit 28 controls the recording unit 14, the driving unit 25, and the illumination unit 22 so as to discharge droplets corresponding to each pixel from the head 18 in accordance with the received print data.

For example, the recording control unit 28 calculates a time from the discharge of ink to the irradiation of light, calculates a gloss of an image formed on the recording medium 101 from the discharge amount of ink to the irradiation of light, and performs an operation to determine the discharge amount of a clear ink for uniformizing the gloss. The recording control unit 28 includes a print sequence setting unit 28A, an allocation pattern storage unit 28B, a gradation allocation setting unit 28C, and a driving waveform generating unit 28D for an image. The printing sequence setting unit 28A sets the printing sequence based on the image data and the printing mode. The printing sequence (see FIG. 7) is set to determine how many times the carriage 200 on which the recording unit 14 is mounted is scanned in the forward direction or the return direction in the main scanning direction for each image area to form an image.

Further, the color ink image formation based on the color ink image data is controlled. That is, the order of formation of each ink color, the amount of placing of each ink, and the placing position (the placement position of the dots) are controlled. In the present embodiment, the allocation pattern storage unit 28B stores a plurality of gradation allocation patterns associated with a head array having a plurality of heads. The gradation allocation setting unit 28C according to the present embodiment sets a different gradation allocation pattern in which the head is the minimum division unit for the entire range of the head array in the sub scanning direction.

Figure 11:
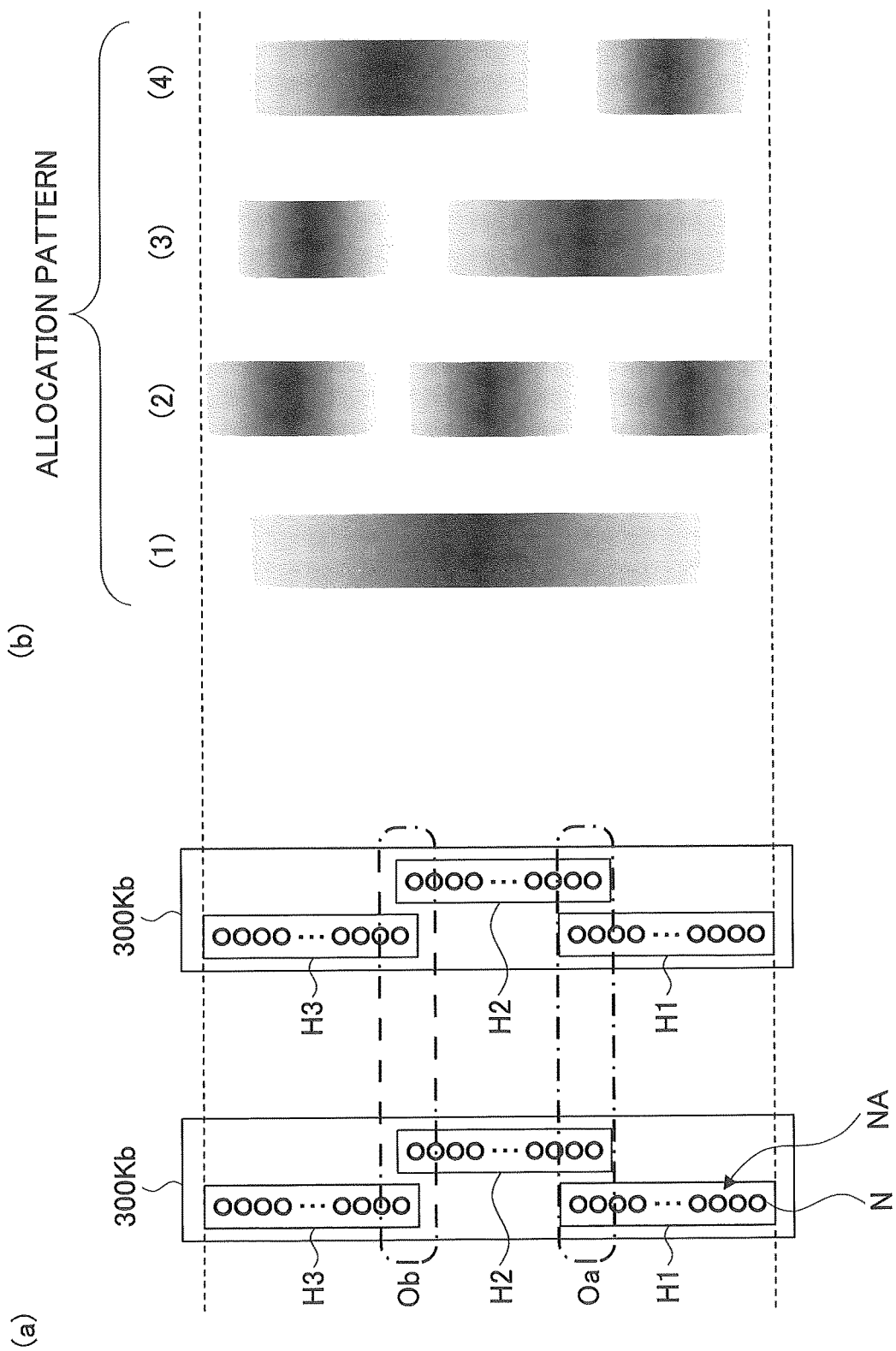
FIG. 11 illustrates an example of a group of gradation allocation patterns according to the first embodiment applied to the head array having three heads in the staggered arrangement.

In this embodiment, the head-to-head gradation allocation pattern associated with the head array includes at least a pattern (FIG. 11(*b*)(1)) that assigns a gradation as a single gradation allocation area across the head array, and may include an allocation pattern (FIG. 11(*b*) (2)) in which the head in the head array is the minimum division unit. Specifically, the gradation allocation pattern is a pattern in which the center is thick in the sub scanning direction and both ends are thin (the number of dots discharged from the nozzle decreases (the printing rate) as the edge becomes smaller). A specific setting example of the gradation allocation pattern is described in detail in FIG. 11 and thereafter. The gradation may not be limited to what monotonically increases and decreases, may partly have noise, and may increase or decrease when the moving average is considered.

Here, the print rate is a value representing the ratio of the pixels of each head of the head unit that are output in response to the value of the pixel data by the discharge operation of the ink from among the pixels related to the nozzle and the corresponding pixel data. For example, when the head unit 300 is scanned at a predetermined speed, when the particular nozzle can be discharged X droplets (X is an integral number), the nozzle executes the discharge operation at all positions, it becomes 100%. However, because the discharge operation may not be performed at all positions, the number of times in which output data (driving data) for actually performing discharge operation is applied with X droplet as the parameter is set to the print rate (%).

An image drive waveform generating unit 28D for image generates driving data based on image data to which a plurality of gradation masks included in the gradation allocation pattern are applied (masked). The recording unit (the head drive unit) drives the heads H1 to H4 based on the driving data generated by the image driving waveform generating unit 28D to discharge liquid from the plurality of nozzles N.

In this block diagram, an example in which a function of adjusting a gradation allocation pattern is provided on the image forming apparatus is described. However, a function of adjusting a gradation allocation pattern may be provided in the data generating unit 12B on the PC2.

In another information processing apparatus connected to the PC2 (for example, a host PC or PLC . . . etc.), a program may be set in advance and stored in a calculation file (for example, a CSV (Comma Separated Value) file or an Excel file) format, and the program may be read in the PC2 to execute the discharge adjustment program of the gradation allocation pattern.

<Print Sequence>

The gradation allocation adjustment of the present invention is applicable to multipath interlaces such as bi-directional printing.

Figure 7:
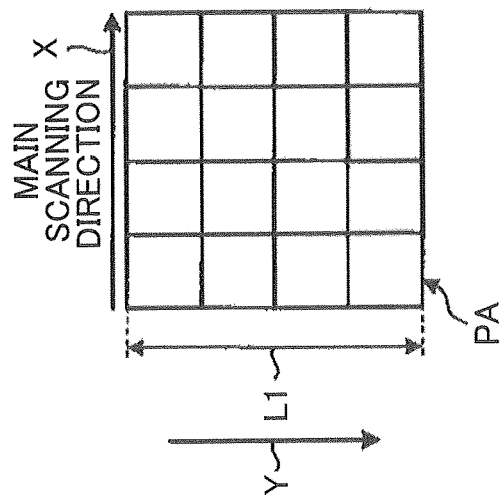
FIGS. 7A to 7H are an explanatory view of a printing sequence.

Here, the printing sequence in the image conversion when generating the image data for each scan from the document (original data) including the multipath interlacing will be described. FIG. 7 is a diagram illustrating a pattern of a plurality of print sequences, and is an explanatory diagram of an image conversion process.

The data generating unit 12B (see FIG. 6) converts image data in an image unit output by scanning (1 scan) of the head unit 300 in the main scanning direction X once according to the printing width, the printing order, and the configuration of the head arrays 300K to 300W as image conversion processing.

One of the squares including the squares illustrated in FIGS. 7A to 7H represents one dot of the recorded image. A number inside a square indicates the scan order of the head. The image data is formed in the order in which the pattern illustrated in FIG. 7 is repeated in the main scanning direction X and the sub scanning direction Y.

In some cases, the hit separation number in the main scanning direction X may be called a path. That is, if the hit separation number in the main scanning direction X is one, it is called one pass, and if it is two, it is called two passes.

In addition, the hit separation number in the sub scanning direction may be referred to as an interlace. That is, the sub scanning direction Y is referred to as a 1/1 interlace if the sub scanning direction Y is separated by one, and a 1/2 interlace if the sub scanning direction Y is separated by two.

The number of types of separating hits is called a hit separation number N. Specifically, N=1 is established for the one pass 1/1 interlace illustrated in FIG. 7B. Further, if the two-pass 1/1 interlace illustrated in FIG. 7C or the one-pass 1/2 interlace illustrated in FIG. 7D, N=2.

If the two-pass 1/2 interlace illustrated in FIG. 7E is used, N=4. A four-pass 1/2 interlace as illustrated in FIG. 7F or a two-pass 1/4 interlace as illustrated in FIG. 7G is N=8. For the four-pass 1/4 interlace illustrated in FIG. 7H, N=16.

The sequence of one pass illustrated in FIGS. 7B and 7D is referred to as the normal mode. The sequence of multiple passes illustrated in FIGS. 7C, 7E, 7F, 7G, and 7H is referred to as the multipath printing mode.

In the control of the present invention, in the head array included in the head unit, the sub scanning direction is divided, and in order to set the gradation allocation pattern for each head array (first embodiment, third embodiment) or for each nozzle array (second embodiment, fourth embodiment) aligned in the scanning direction, it can be applied to a multi-pass interlacing, which is a two-way printing in which images are printed in superimposition.

In the ink jet recording apparatuses 1 and 10, the multipath printing mode and the multipath number at the time thereof are specified, the interlace printing mode and the number of interlaces thereof are specified in advance by the setting of the initial setting printing method, and the specified printing mode (multipath printing mode), the multipath number, and the interlace number are stored in a storage medium such as a memory (not illustrated) as the printing method.

The setting of the gradation allocation pattern of the present invention will be described below when the print sequence is a multipath interlace.

Example of Gloss Banding Generated by Printing with Multipass Interlace

Figure 9A:
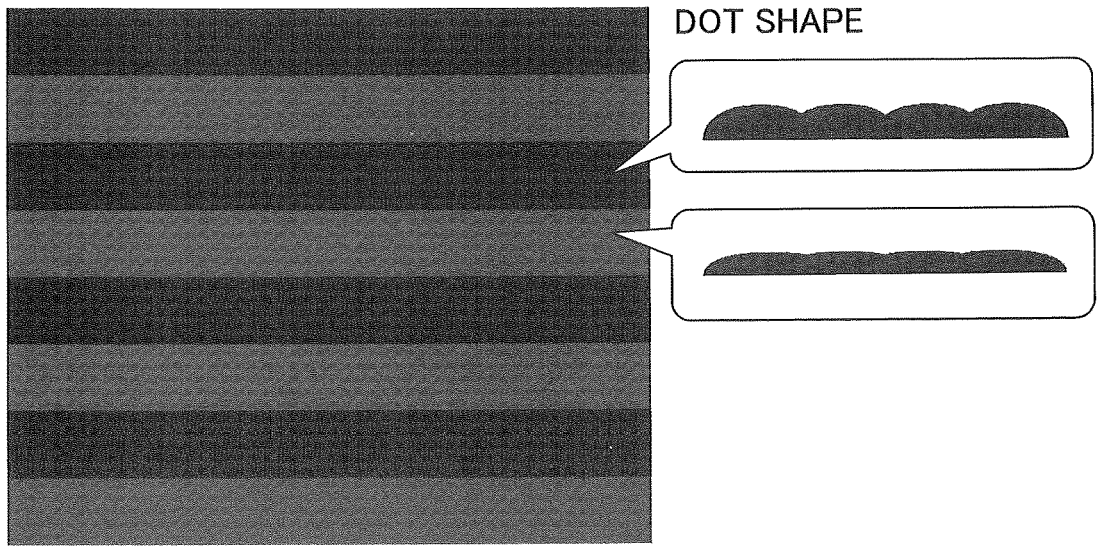
FIGS. 9A and 9B are explanatory views of gloss banding.
Figure 9B:
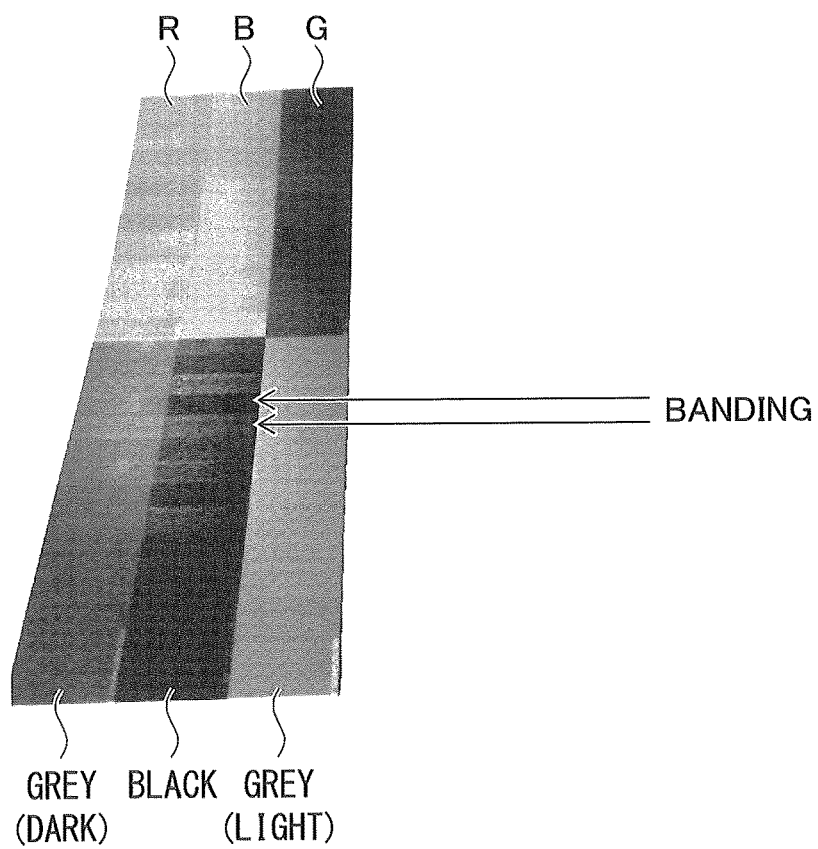

Here, the gloss banding generated when the image is formed in the printing mode of the multipath interlace will be described with reference to FIGS. 8 and 9A-9B. FIG. 8 is a diagram illustrating a mechanism for generating the bright banding, and FIG. 9 is a diagram illustrating the bright banding. Specifically, in FIG. 8, a gloss banding generated when an image is formed in the recording medium 101 by scanning the image area eight times by setting the printing sequence N=8 of FIGS. 7F and 7G.

FIG. 9A is a schematic diagram of a black fill diagram, and FIG. 9B is a photograph of a recording medium filled with a plurality of colors. As illustrated in FIG. 8, when interactive printing is performed using a plurality of head arrays, the top layer color differs depending on the order of overlap of dots. In this way, when the ink reacts chemically by receiving UV light, a difference occurs in the time from the discharge of the ink until the light is irradiated due to the difference in the order of the overlap of the colors of the dots. Therefore, the difference in the time when the ink hardens and contracts after the ammunition causes the boundary between the curing unit and the uncured unit. Such a cured-uncured border occurs in a band along the scanning direction of the head, resulting in a glossy banding of the recorded image which is so-called glossy unevenness.

Such boundaries occur in a strip along the scanning direction of the head, as illustrated in FIGS. 8 and 9, resulting in a glossy banding that is glossy due to the height of the ink in the recorded image during curing.

As illustrated in the photograph of FIG. 9b, the gloss banding is particularly likely to occur in black.

Figure 10:
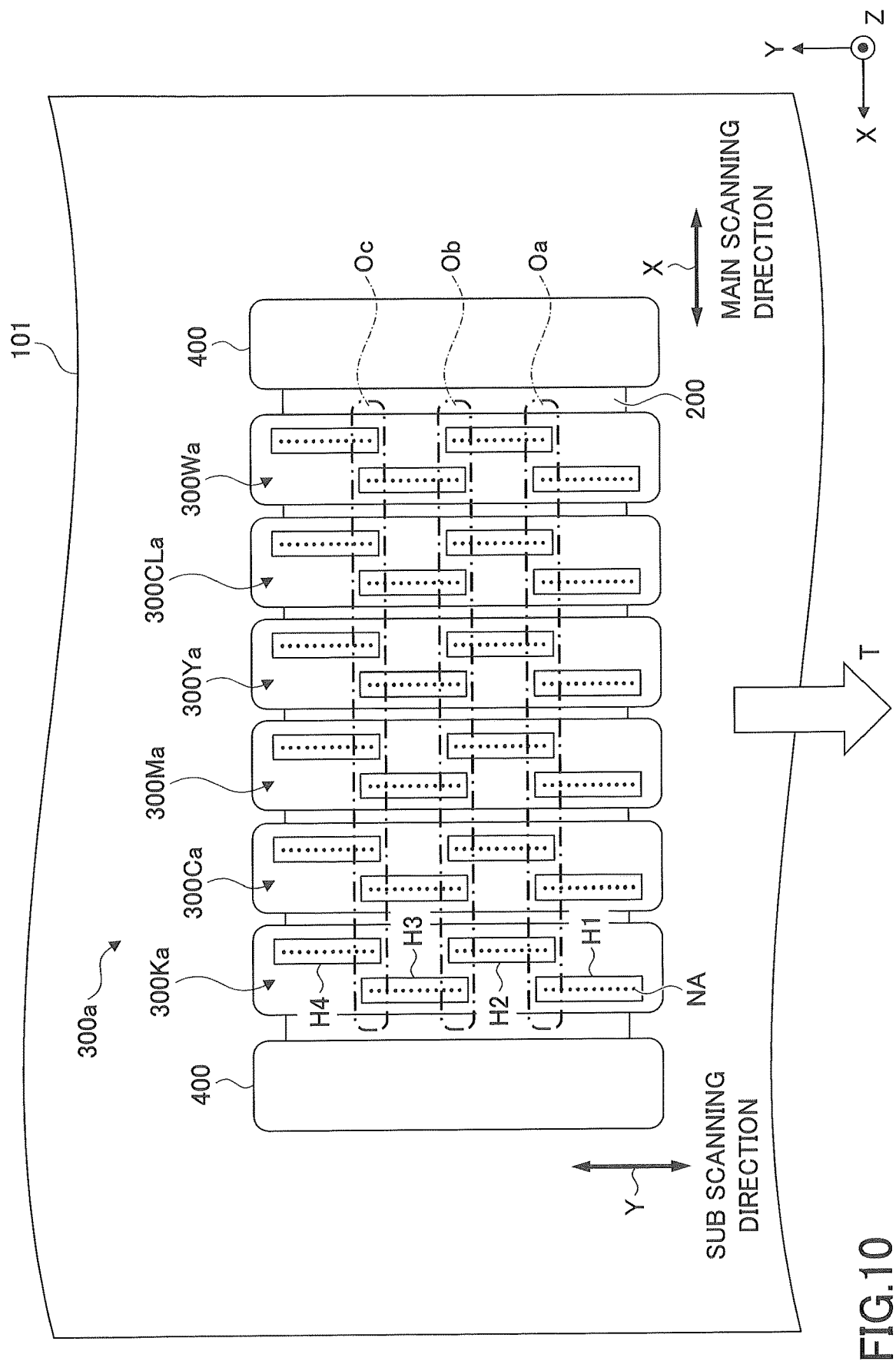
FIG. 10 is a plan view around an image forming unit including a head array having a plurality of heads in a staggered arrangement according to a first embodiment of the present invention.

Further, in the conventional example illustrated in FIG. 1, because the printing rate of the recording element in the joint area of the recording element group is set to be smaller than the printing rate of the recording element other than the joint area, density unevenness caused by the joint of the head (density banding) can be suppressed. However, because the density adjustment is made for each head, the gradation is steeper, and the bright banding may become noticeable. In order to suppress such gloss banding, in the first embodiment of the present invention, a plurality of heads are arranged in the sub scanning direction in the head array so as to assign a gradation pattern in which the head is the minimum unit in the head array. Here, an example in which a plurality of heads are provided in each head array is illustrated in FIG. 10. FIG. 10 is a plan view illustrating a periphery of an image forming unit in which a plurality of heads are staggered and mounted to the head array according to a first embodiment of the present invention.

As illustrated in FIG. 10, the image forming unit 300a according to the present exemplary embodiment includes a serial head array. Six head arrays, 300 Ka, 300 Ca, 300 Ma, 300 Ya, 300 CLa, and 300 Wa, corresponding to black (K), cyan (C), magenta (M) and yellow (Y), clear (CL), and white (W), are arranged from the left side of FIG. 5.

The head array 300Ka of the black (K) according to this embodiment is arranged in a staggered pattern of four heads H1, H2, H3, and H4 in the nozzle array direction Y parallel to the transport direction T of the recording medium 101. The heads H1, H2, H3, and H4 each have a plurality of nozzle rows NA in the X direction.

In each of the heads H1, H2, H3, and H4, a plurality of nozzles discharging droplets onto the recording medium 101 are arranged in a row (sub scanning direction) of nozzles. In each of the heads H1, H2, H3 and H4, the nozzle rows may be one or two or more rows in the X direction in parallel.

In the head array 300 Ka, the ends of the nozzle rows of adjacent heads overlap each other in the nozzle row Y and are positioned at different positions in the conveying direction T. The nozzle array direction Y is the same direction as the conveying direction.

In FIG. 10, the areas where the ends of the nozzle rows of adjacent heads overlap each other in the nozzle row direction Y are indicated by the thick dotted line portions Oa, Ob, and Oc. This area is Oa, Ob, and Oc as overlapping portions.

Because the ends of the nozzle rows of adjacent heads overlap each other in the nozzle row direction Y, the image forming unit 300a can form a seamless image between the heads in the nozzle row direction Y of the recording medium 101. Because the configurations of the other head arrays 300 Ca, 300 Ma, 300 Ya, 300 CLa, and 300 Wa are the same as those of the black (K) head array 300 Ka, the description thereof will not be repeated.

FIG. 10 illustrates an example in which the four heads H1 to H4 are provided in the head array 300 Ka. However, the number and arrangement of the heads provided in the head array are not limited thereto, and they can be appropriately changed. Incidentally, in the first embodiment described below, in order to perform dot adjustment, it is assumed that two or more heads are provided in the sub scanning direction (Y) in each head array.

Control of First Embodiment (Example of Gradation Allocation Pattern for 3 Heads)

Next, an example of an allocation pattern for a head array having a plurality of heads in the sub scanning direction will be described with reference to FIG. 11. FIG. 11 is a diagram illustrating an example of a group of allocation patterns according to a first embodiment applied to a head array having three heads. In FIG. 10, four heads H1 to H4 are provided in the head array. In FIG. 11, three heads H1 to H3 are provided in each head array.

In particular, in FIG. 11, (a) is a conceptual diagram illustrating a configuration of a plurality of head arrays 300 Kb and 300 Cb, and (b) is a diagram illustrating a group of allocation patterns of a plurality of gradients that can be applied to each of the head arrays 300 Kb and 300 Cb, respectively. The head arrays 300Kb and 300Cb correspond to one example of a first head array and a second head array, respectively.

In FIG. 11(b), FIG. 11(1) illustrates an example of assigning a gradation to the entire head array as a gradation allocation area.

The allocation pattern (1) corresponds to the first pattern.

The allocation pattern (2) illustrates an example in which a head array of 300 Kb and 300 Cb is divided to be the same number as heads H1, H2, and H3 (=3) and a gradation with an equal length is assigned as a gradation allocation area for each head. The allocation patterns (2), (3), and (4) correspond to the second pattern.

The allocation patterns (3) and (4) illustrate an example in which a head array is divided so that the number of heads is less than (=2) and a gradation allocation area is assigned for each of the different numbers of heads, and a gradation of different lengths is assigned for one head array. That is, examples of (3) and (4) include the area in which the gradation is set as one unit of the first number of heads and the area in which the gradation is set as one unit of the second number of heads different from the first number of heads.

Specifically, the example in (3) is illustrated in which two heads H1 and H2 are set to one unit in the allocation area to which one gradation is applied, and head H3 is set to one unit in the gradation allocation area.

The allocation pattern (4) illustrates an example in which one gradation allocation area is set as one head H1 unit and one gradation allocation area is set as one head H2 and H3 unit.

Here, as for the gradation allocation pattern, when a gradation is applied over a wide range as illustrated in (1), the bright banding is not noticeable because the gradation is gentle, but the density banding caused by the joint of the heads is noticeable.

On the other hand, when the gradation is applied to each head as illustrated in (2), the density banding caused by the joint of the heads is prevented, but the gradation is sudden, so that the bright banding is noticeable.

In addition, in the allocation patterns (3) and (4), as in the case of (2) a gradation is applied to each head, density banding is prevented, and the bright banding is conspicuous. In the case of the gradation is applied to two heads as one unit, the bright banding is prevented, and the density banding is noticeable, as in the case of the gradation is applied to the whole area.

By selecting the mask of the gradation allocation pattern including different division units for each head array from among the gradation allocation patterns having different characteristics as described above, both countermeasures against concentration banding and countermeasures against gloss banding are combined for each color. Therefore, both density banding and gloss banding can be suppressed in the image formed.

Here, in the plurality of head arrays 300Kb and 300Cb, when selecting a gradation allocation mask, it is preferable to include at least one gradation allocation pattern (1) illustrated in FIG. 11(b) in order to prevent gloss banding.

Example of Gradation Allocation Pattern for 4 Heads

Figure 12:
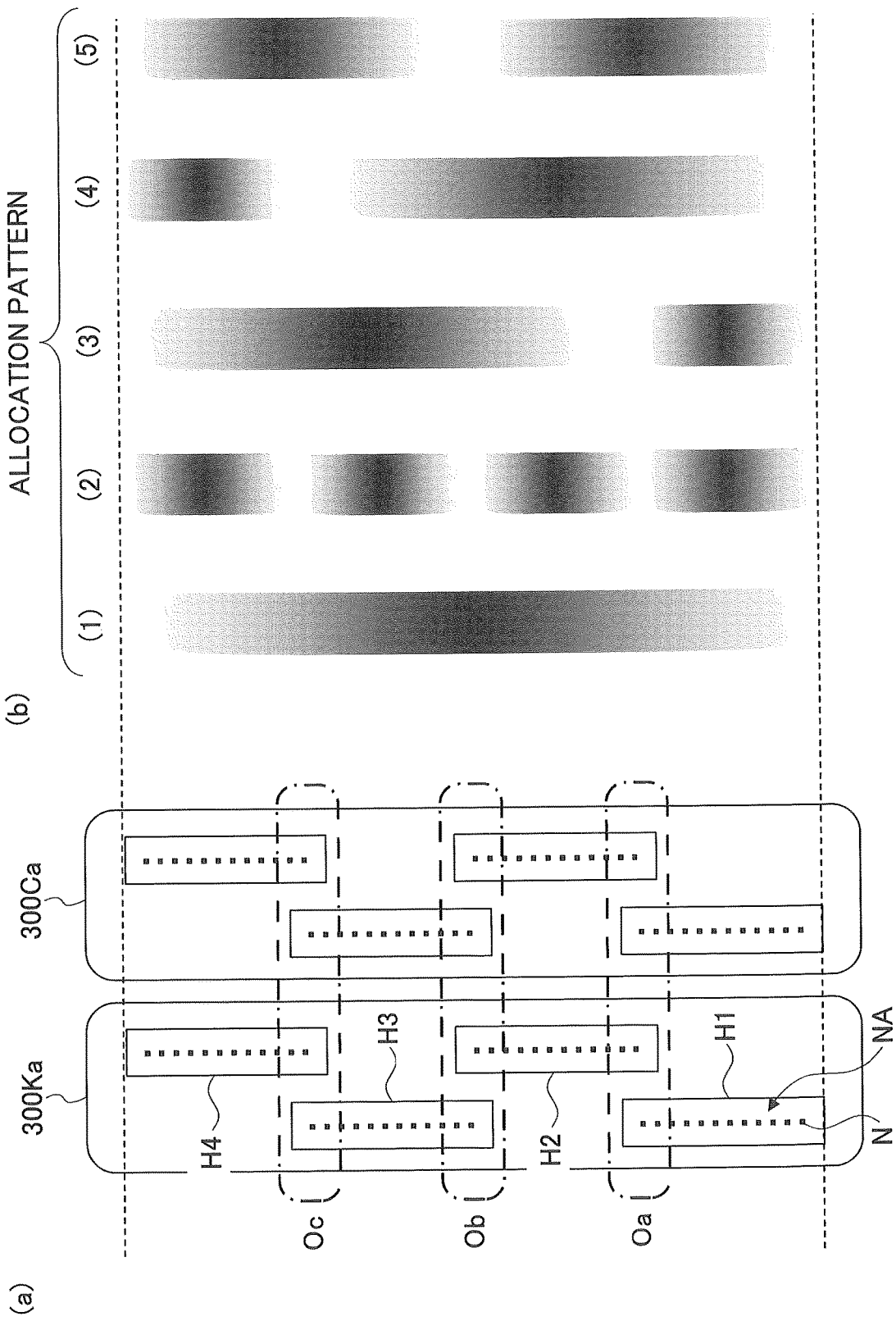
FIG. 12 illustrates an example of a group of gradation allocation patterns according to the first embodiment applied to a head array having four heads in the staggered arrangement.

FIG. 12 is a diagram illustrating an example of a group of allocation patterns according to a first embodiment in a head array having four heads.

In particular, in FIG. 12, (a) is a conceptual diagram illustrating a configuration of a plurality of head arrays 300 Ka, 300 Ca, and (b) is a diagram illustrating an allocation pattern of a plurality of gradients that can be applied to each of the head arrays 300 Ka, 300 Ca, respectively. The head arrays 300 Ka and 300 Ca correspond to one example of a first head array and a second head array, respectively.

In FIG. 12(b), (1) illustrates an example of assigning a gradation to the entire head array as a single gradation allocation area. The allocation pattern in (1) corresponds to the first pattern. (2) illustrates an example in which a head array is divided to be the same number as a head (=4) and a gradation of equal length is assigned as a gradation allocation area for each head. Allocation patterns (2), (3), (4), and (5) correspond to the second pattern. (3) illustrates an example in which three heads H1, H2, and H3 are set to one unit in the allocation area to which one gradation applies, and head H4 is set to one unit in the gradation allocation area. (4) illustrates an example in which one gradation allocation area is set for one head H1 unit and three heads H2, H3, and H4 are set for one gradation allocation area. (5) illustrates an example in which two heads H1 and H2 are set to one gradation allocation area and two heads H3 and H4 are set to one gradation allocation area.

That is, in (5), a gradation allocation pattern in which one gradation is equally allocated for each of a plurality of heads (two heads) is set. Although not illustrated in the drawings, in the head array having four heads, three gradation allocation patterns can be set including two gradients in which one head is assigned to one area and one gradation in which two heads are assigned to one area as an example of dividing the gradation area into three. Therefore, in a configuration in which four heads are included in the head array, the number of configurable gradation allocation patterns is eight. As compared to FIGS. 11 and 12, the more heads are provided in the sub scanning direction in one head array, the greater the number of selectable gradation allocations also increases.

If you set the gradation in head units and set the number of configurable gradation allocation patterns to P, it is represented by "P=2n" where n corresponds to "number of heads". Therefore, the number of heads in the head array is two in the case of two, four in the case of three, eight in the case of four, 16 in the case of five, and 32 in the case of six. These applicable gradation allocation patterns are preferably stored in the allocation pattern storage unit 28B in advance as a group of gradation allocation patterns for each number of heads. Depending on the number of head arrays to be used, among the groups of allocation patterns, at least one head is set by selecting a gradation allocation pattern to differ from the other heads.

(Flow of First Example)

Figure 13:
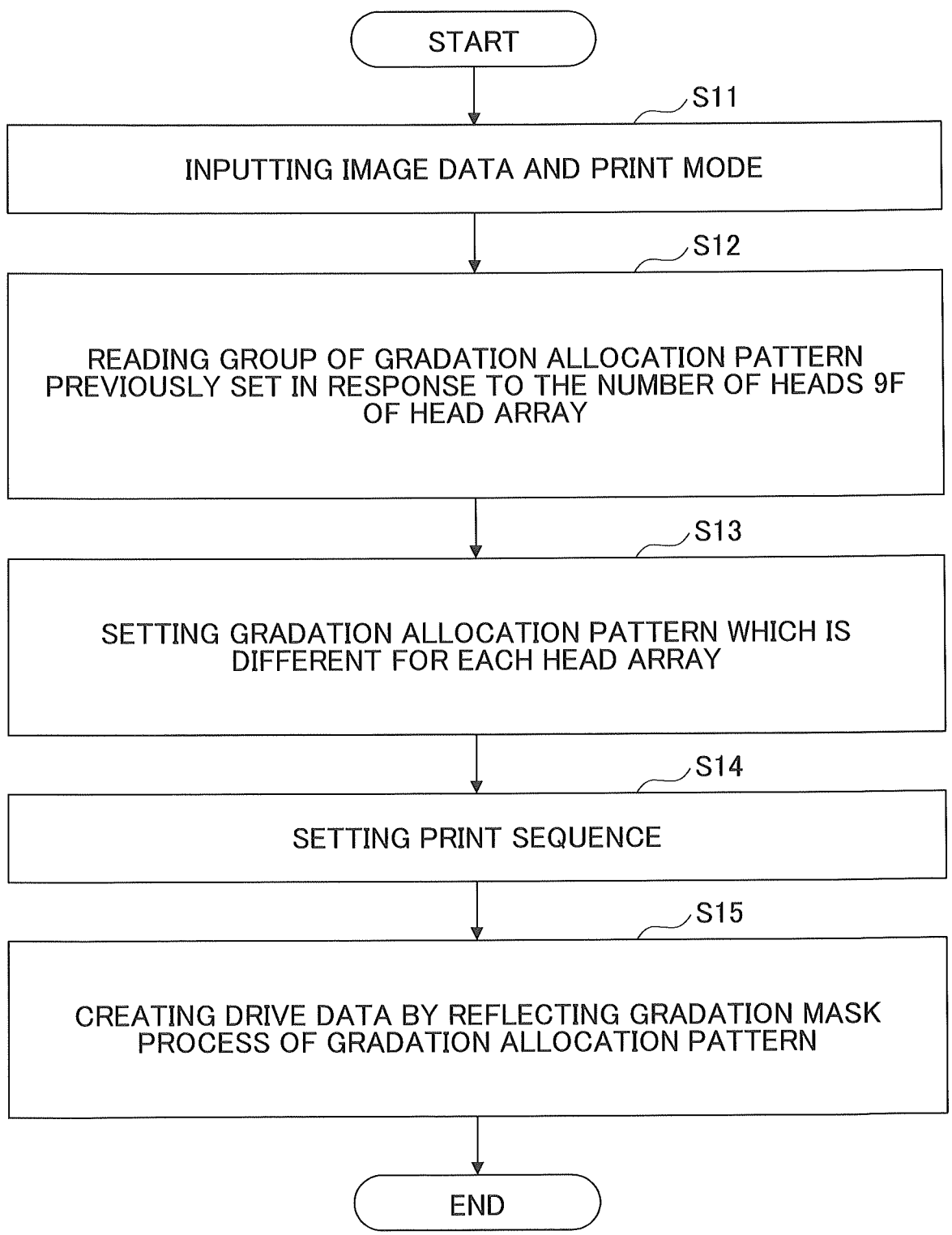
FIG. 13 is a control flow chart according to the first embodiment of the present invention.

FIG. 13 is a flowchart illustrating a procedure for setting a gradation mask according to a first embodiment of the present invention.

In step S11, the image data and the printing mode are input.

In step S12, a group of a plurality of gradation allocation patterns set according to the number of heads in the head array is read out.

In Step S13, from a group of gradation allocation patterns read in S12, a different gradation allocation pattern is selected and set for each head array. The gradation allocation pattern includes a first pattern in which one gradation is set so that the central printing ratio is large and the printing ratio of both ends is small for the entire area of the head array in the sub scanning direction, and a second pattern in which the gradation is set so that the central printing ratio is large and the printing ratio of both ends is small for each given number of heads.

Then, in step S14, the printing sequence is determined, and the number of scans for printing is set. The setting of the printing sequence of S14 may be performed in parallel with steps S12 and S13.

In Step S15, the gradation mask process corresponding to the selected gradation allocation pattern is performed for the image data, and the data is output as the driving data (the driving waveform) and transmitted to the recording unit (the head drive unit).

Thus, by setting a different gradation allocation pattern for the head array, both density banding and gloss banding can be suppressed in the formed image in order to apply a different range length gradation mask with the head as the minimum unit to each head array or each nozzle array of the head array. Specific examples of allocations will be described below.

Allocation Example 1: Heterochrome Head Array

Figure 14:
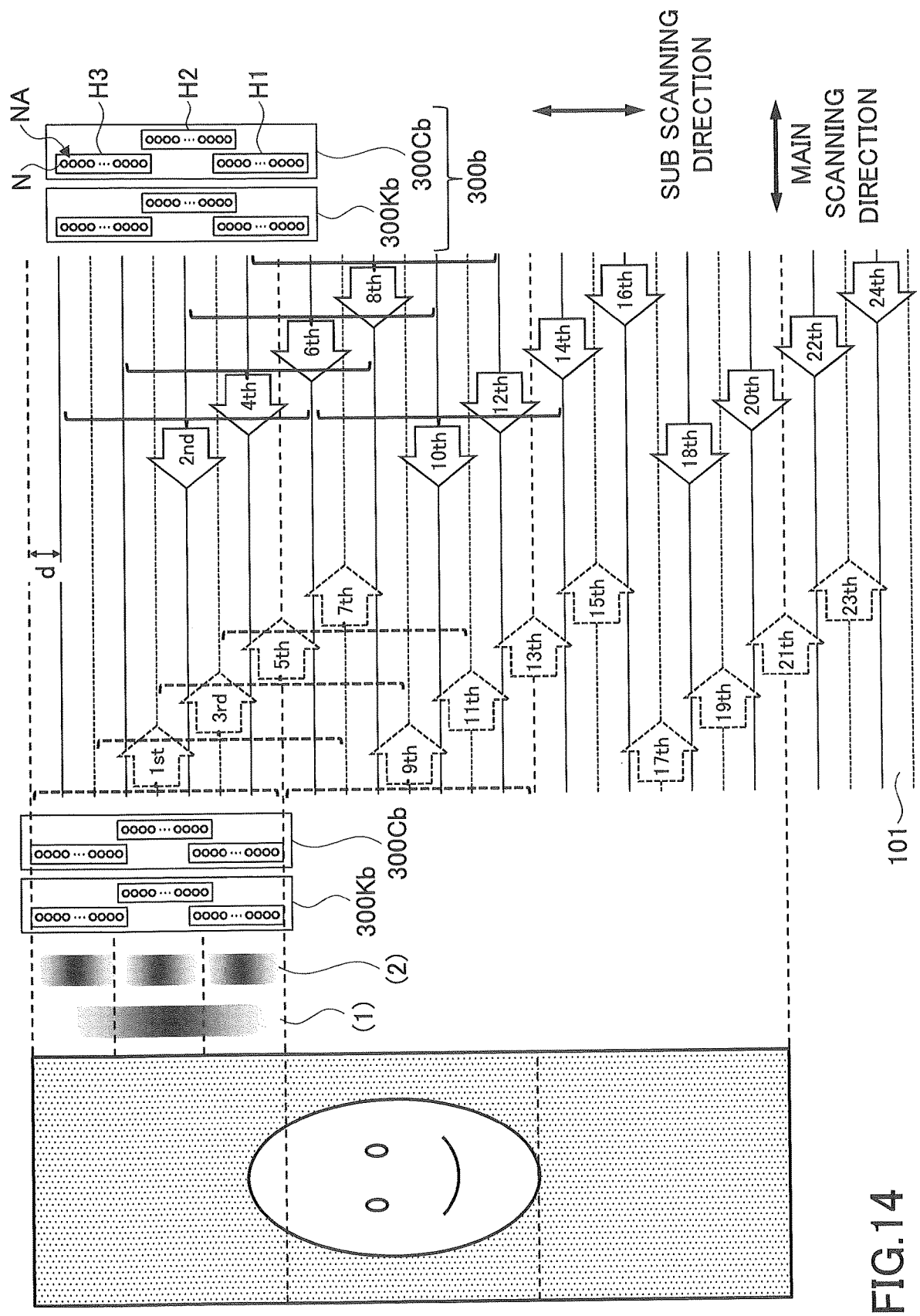
FIG. 14 is an explanatory view illustrating an example of applying a gradation allocation pattern according to the first embodiment to a head array of different colors when an image is formed by scanning one image area eight times.

FIG. 14 is an explanatory diagram illustrating an example in which, when an image is formed by scanning one image area eight times, a gradation allocation pattern according to the first embodiment is applied to each head array of different colors.

In FIG. 14, in the multi-path interlace, each image area is scanned while performing a second operation in each path. Therefore, in the sub scanning direction of the scanning area of the head, the image data is divided into blocks according to the number of passes, and an image is formed by complementing each other so that multiple passes overlap each other.

Here, the overlapping portions of the paths for forming one image are allocated (sorted out) the image data for forming one image for each of the multiple scans so that the images formed by the other scans complement each other.

For example, an image area 1 corresponding to one head array is allocated and formed in the 1st to 8th scans, an image area 2 is allocated and formed in the 5th to 16th scans, and an image area 3 is allocated and formed in the 13th to 24th scans. That is, one image area is formed in eight scans.

Therefore, when assigning a gradation allocation pattern to an image formed by such a multipath interlace, it is preferable to set the gradation allocation pattern immediately after input of the image data, apply the gradation masks included in the pattern respectively, and then allocate the image data for each scan to each image area.

When an image is formed by a multipath interlace that is scanned while running in a new way, the gradation allocation pattern is set to be different for each head array, so that the gradation with a different variation range is included. Accordingly, a rapid gradation and a gradual gradation are mixed in the image data, and both density banding and gloss banding can be suppressed.

Allocation Example 2: Homologous Head Array

Figure 15:
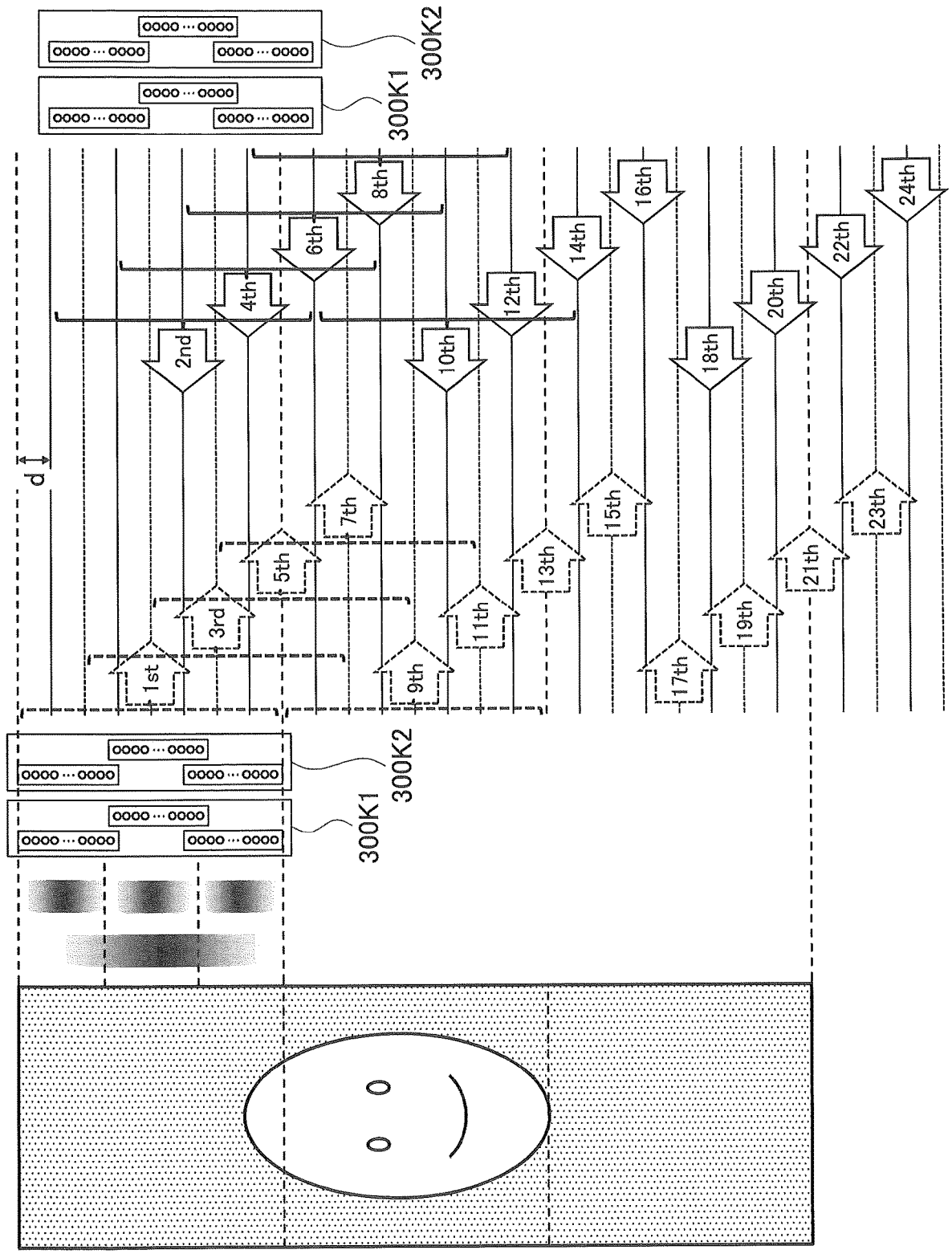
FIG. 15 is an explanatory view illustrating an example of applying a gradation allocation pattern according to the first embodiment to a head array of the same color when an image is formed by scanning one image area eight times.

FIG. 15 is an explanatory diagram illustrating an example in which, when an image is formed by scanning one image area eight times, a gradation allocation pattern according to the first embodiment is applied to each head array of the same color. Although FIG. 14 above illustrates an example in which different gradation allocation patterns are set for different colors of head arrays, if two or more head arrays of the same color 300K1 and 300K2 are provided in the head unit, different gradation allocation patterns may be set for each of the head arrays of the same color for the entire area of the head array in which the head is the minimum division unit. Even in the configuration in which two head arrays of the same color 300K1 and 300K2 are provided, the time until curing by irradiation differs depending on whether the scanning is performed in an odd number or even number of times. Therefore, there is a possibility that a gloss banding occurs. However, as illustrated in FIG. 15, both the density banding and the gloss banding can be suppressed by setting the gradation allocation pattern differently for each head array. Although the foregoing describes an array of heads in which the plurality of heads are in the staggered arrangement, the plurality of heads provided in the array of heads to which the first embodiment of the present invention applies may have different shapes.

First Modification

Figure 16:
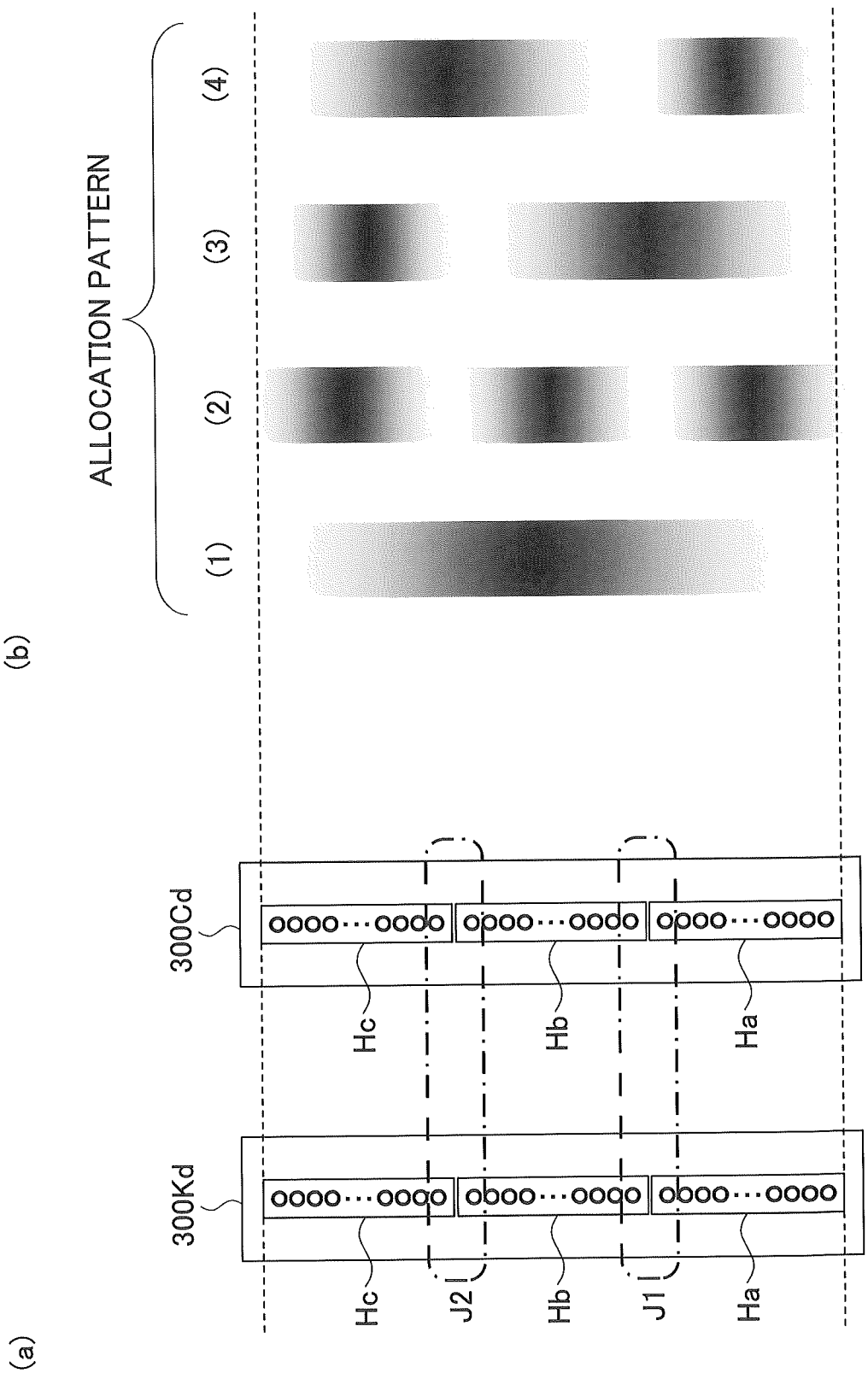
FIG. 16 is a diagram illustrating an example of a group of a plurality of gradation allocation patterns according to the first embodiment, wherein a plurality of heads are applied to a linearly arranged head array according to a first modification.

FIG. 16 is a diagram illustrating an example of a group of gradation allocation patterns of the first embodiment applied to a head array having a plurality of heads linearly arranged according to a first modification.

Specifically, in FIG. 16, (a) is a conceptual diagram illustrating a configuration of a plurality of head arrays 300 Kd and 300 Cd, and (b) is a diagram illustrating an example of a group of a plurality of gradation allocation patterns that can be applied to each of the head arrays 300 Kd and 300 Cd, respectively. The head arrays 300 Kd and 300 Cd correspond to one example of a first head array and a second head array, respectively.

The head arrays 300 Kd and 300 Cd illustrated in FIG. 16(a) are arranged in contact or in close proximity so that three or more heads Ha, Hb, and Hc are aligned in a linear manner in the sub scanning direction. In this configuration, the boundary of the adjacent head, which is not overlapped, is connected to the joint regions J1 and J2.

The gradation allocation pattern illustrated in FIG. 16(b) is the same as that illustrated in FIG. 11(b).

Even in the present modification, in order to apply a gradation mask having a different range length and a minimum unit of the head to each head array, both countermeasures against concentration banding and countermeasures against gloss banding are combined for each color. Therefore, both density banding and gloss banding can be suppressed in the image formed.

FIG. 16 illustrates an example in which a gradation mask of a different range length according to a first embodiment is applied to a head array of a different color in the first modification. However, a gradation mask of a different range length according to a first embodiment may be applied to a plurality of head arrays of the same color in the present configuration as illustrated in FIG. 15.

Second Modification

Figure 17:
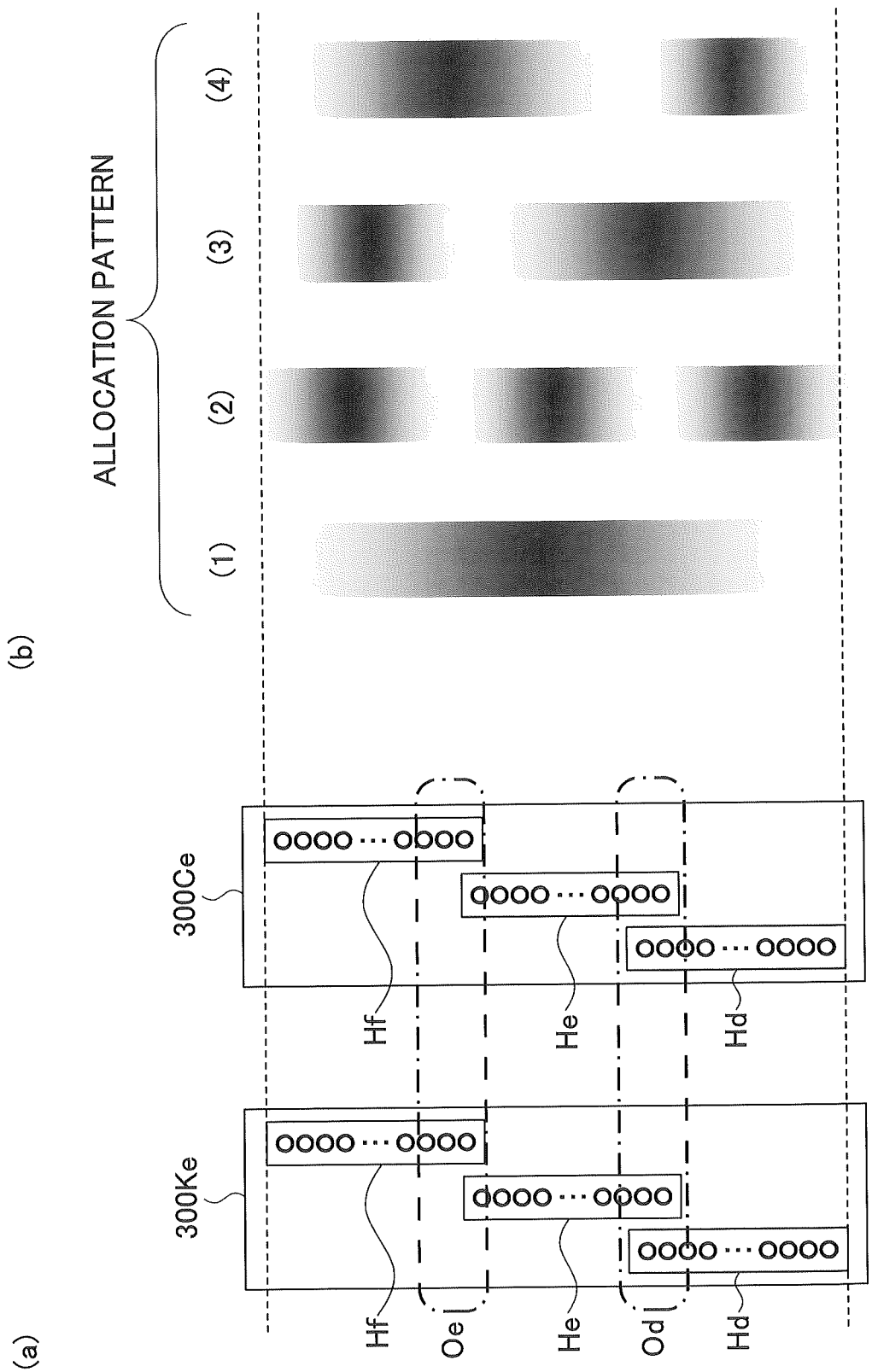
FIG. 17 is a diagram illustrating an example of a group of a plurality of gradation allocation patterns according to a first embodiment, wherein a plurality of heads are applied to a head array arranged in a stepped manner according to a second modification.

FIG. 17 is a diagram illustrating an example of a group of a plurality of gradation allocation patterns according to a first embodiment, wherein a plurality of heads are applied to a head array arranged in a stepped manner according to a second modification.

Specifically, in FIG. 17, (a) is a conceptual diagram illustrating a configuration of a plurality of head arrays 300Ke and 300Ce, and (b) is a diagram illustrating an example of a group of a plurality of gradation allocation patterns that can be applied to each of the head arrays 300Ke and 300Ce, respectively. The head arrays 300Ke and 300Ce correspond to one example of a first head array and a second head array, respectively. The head arrays 300Ke and 300Ce illustrated in FIG. 17A are arranged such that three or more heads Hd, He, and Hf are arranged in a step-wise manner, that the heads Hd, He, and Hf change in the same direction in the scanning direction, and that the adjacent heads overlap at the ends of the nozzle array in the sub scanning direction. In this configuration, the jointing area where the boundary of the adjacent head overlaps is Od and Oe. The gradation allocation pattern illustrated in FIG. 17(b) is the same as that illustrated in FIG. 11(b). Even in this variation, because a gradation mask of different range length in which the head is the minimum unit is applied to each array of heads or each nozzle array of the head array, both countermeasures against concentration banding and countermeasures against gloss banding are combined for each color. Therefore, both density banding and gloss banding can be suppressed in the image formed.

FIG. 17 illustrates an example in which a gradation mask of a different range length according to a first embodiment is applied to a head array of a different color in the second modification. However, a gradation mask of a different range length according to a first embodiment may be applied to a plurality of head arrays of the same color in the present configuration as illustrated in FIG. 15. In the above-described FIGS. 11, 12, 14, and 15, an example in which a nozzle array in one row is provided in the scanning direction of each head has been described. However, even in the configuration in which a plurality of nozzle arrays are provided in each head, a gradation mask of a different range length according to the first embodiment may be applied to a plurality of head arrays of the same color. Alternatively, in an arrangement in which a plurality of nozzle rows are provided in each head, a different gradation pattern can be assigned to each nozzle row in the head. This example will be described below as a second example.

Second Embodiment

Next, discharge adjustment according to the second embodiment of the present invention will be described with reference to FIGS. 18 to 20. The second embodiment describes the allocation of a gradation pattern for a head array having heads in which a nozzle array is arranged in a plurality of sub scanning directions. In this control, the pattern is allocated to each nozzle array. Therefore, the head array may be one in the sub scanning direction or a plurality of head arrays may be provided in the head unit as in the first embodiment.

Figure 18:
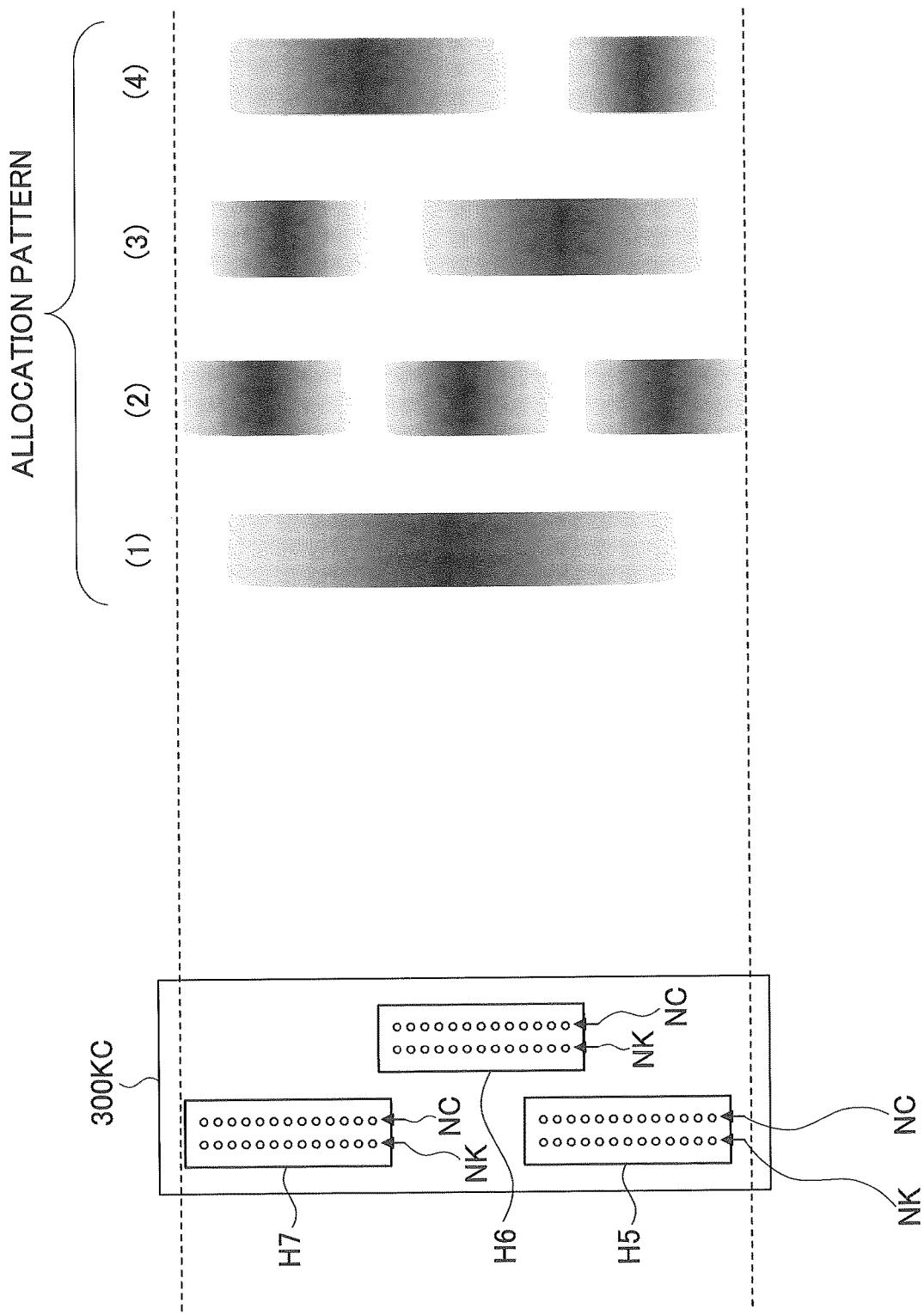
FIG. 18 illustrates an example of a group of a plurality of gradation allocation patterns according to the second embodiment, wherein a head having a plurality of nozzle rows is applied to a head array arranged in a staggered manner.

FIG. 18 is a diagram illustrating an example of a group of a plurality of gradation allocation patterns according to a second embodiment, wherein a head having a plurality of nozzle rows is applied to a head array arranged in a staggered manner.

Figure 19:
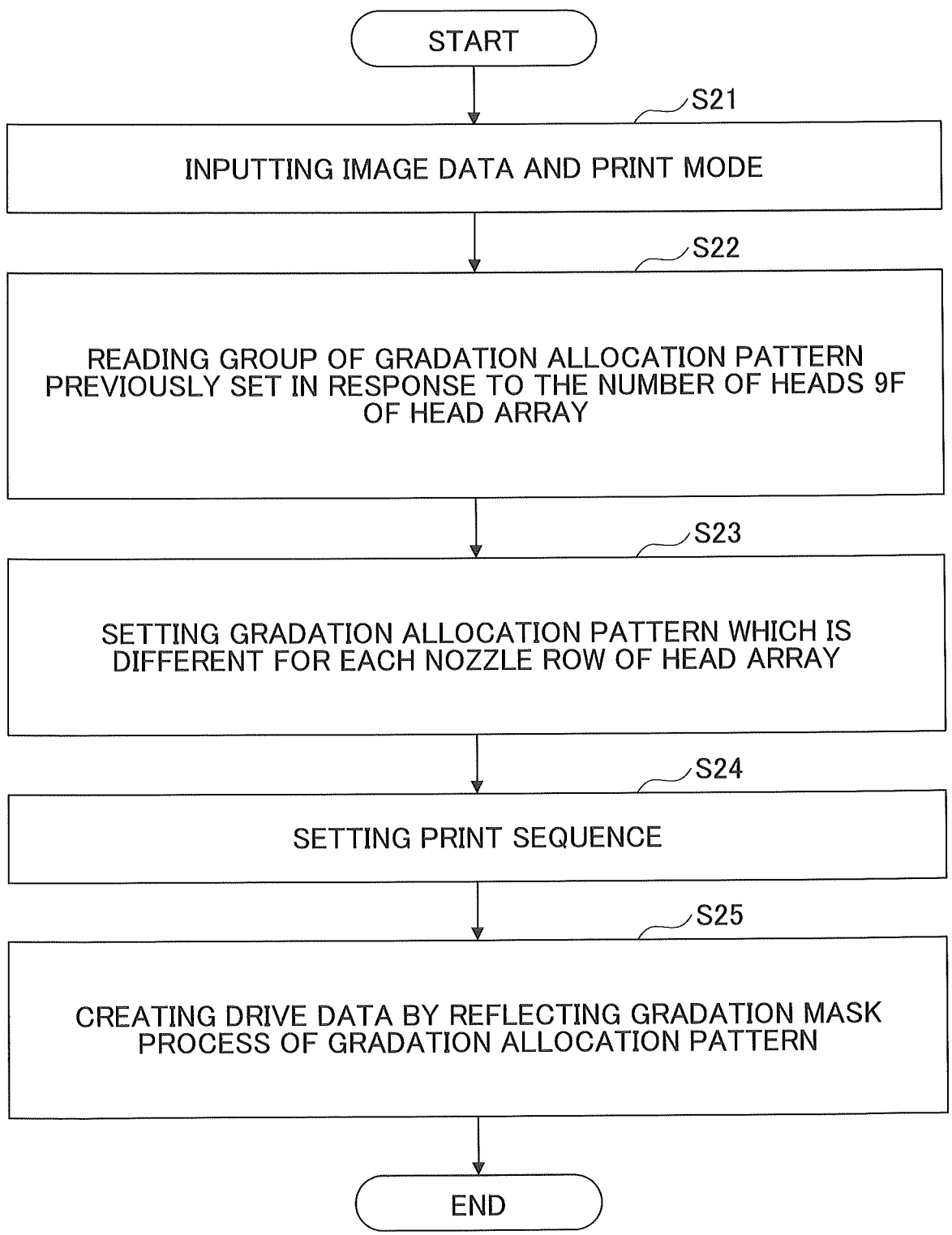
FIG. 19 is a control flow chart according to a second embodiment of the present invention.

Specifically, in FIG. 19, (a) is a conceptual diagram illustrating the structure of a plurality of nozzle rows NK and NC in the head array 300 KC, and (b) is a diagram illustrating an example of a plurality of groups of gradation allocation patterns that can be applied to each nozzle NK and NC in the head array 300 KC. The nozzle rows NK and NC correspond to one example of a first nozzle row and a second nozzle row, respectively.

The second embodiment differs from the first embodiment in that the image data is masked using the first pattern for the first nozzle array (nozzle array NK) included in the head array and the second pattern for the second nozzle array (nozzle array NC). In the sub scanning direction, the first pattern in which one gradation is set so as to increase the printing rate at the center and decrease the printing rate at both ends for the entire region of the head array, and the second pattern in which the gradation is set so as to increase the printing rate at the center and decrease the printing rate at both ends for any number of heads are set are common to the first embodiment. As in the first embodiment, the gradation pattern of the entire head array of (1) illustrates that the gloss banding has a high suppressive effect and the density banding has a low suppressive effect.

On the other hand, for each of the heads in (2), the suppression effect of density banding caused by gradation patterns and joints is high, and the suppression effect of gloss banding is low. Therefore, in this control, a first pattern (gradient) is set for one nozzle column NK, and a second pattern (gradation pattern) different from the first pattern is selected from FIGS. 18(1) to 18(4) and set for the other nozzle column CN. When selecting a gradation allocation pattern (mask) in a plurality of nozzle rows, it is preferable to include at least one gradation allocation pattern (1) illustrated in FIG. 18(b) in order to prevent gloss banding. Therefore, for example, it is preferable that the gradation pattern of (1) of FIG. 18(b) be selected as the first pattern, and the gradation pattern of (2), (3), or (4) of FIG. 18(b) are selected as the second pattern, and set for each nozzle row.

The configuration for executing the second embodiment is common to the functional block diagram of FIG. 6 for executing the first embodiment.

FIG. 19 is a control flow chart according to a second embodiment of the present invention. In the present embodiment, in S23, a different gradation allocation pattern is assigned to each nozzle array of the head array. Other points are similar to those of the first embodiment.

Figure 20:
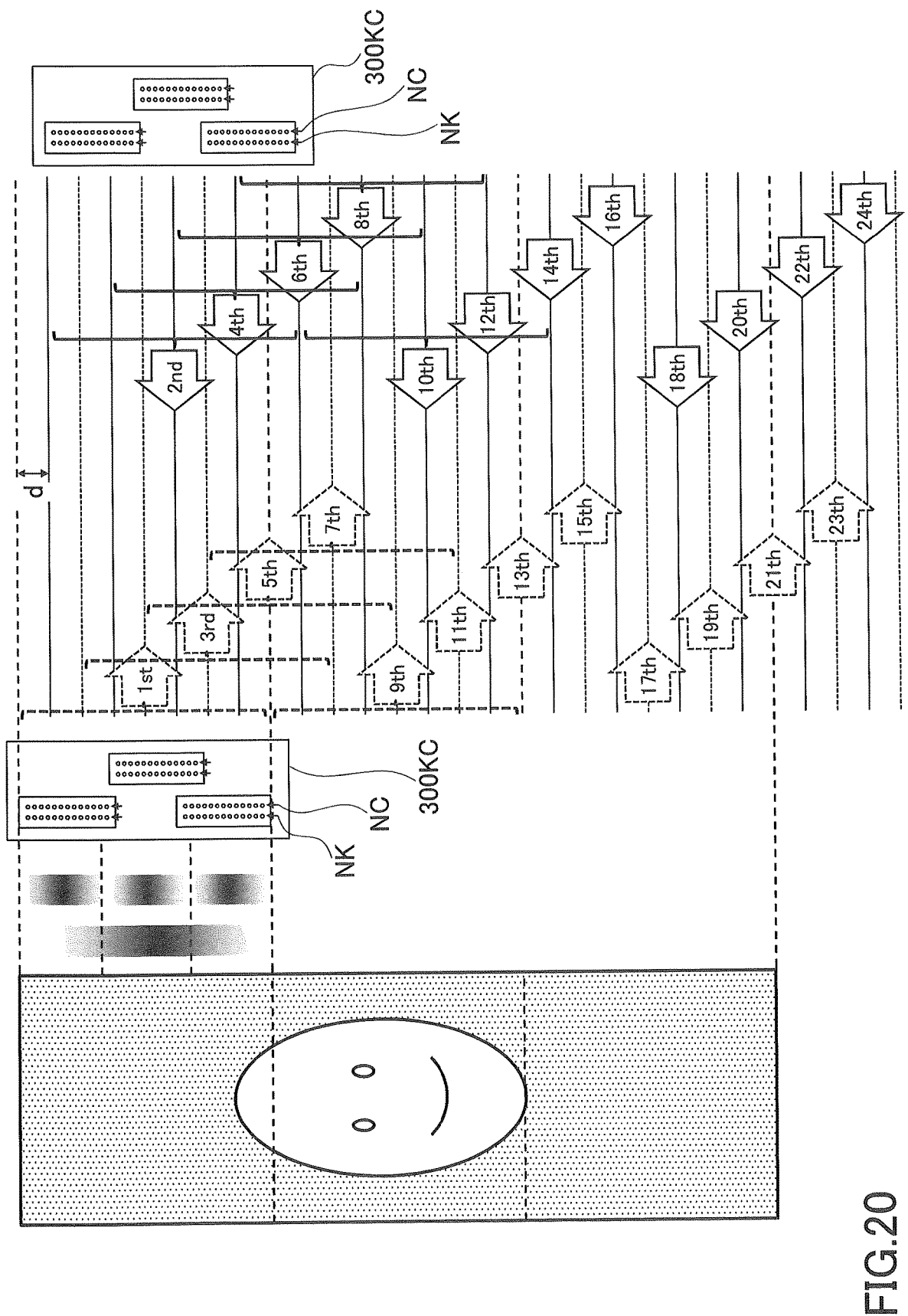
FIG. 20 is an explanatory view illustrating an example of applying a gradation allocation pattern according to a second embodiment to a nozzle array of different colors when an image is formed by scanning one image area eight times.

FIG. 20 is an explanatory diagram illustrating an example in which when an image is formed by scanning one image area eight times, a gradation allocation pattern according to the second embodiment is applied to each nozzle array of different colors. Even in the present embodiment, in the multipath interlacing, the image data is divided into blocks according to the number of passes in the sub scanning direction of the scanning area of the head in order to cause each image area to be scanned while each path is repeated, and the images are formed by complementing each other so that multiple passes overlap each other. The overlapping portions of the paths for forming one image are allocated (separated) the image data for forming one image for each of the nozzle rows so that the images formed by the other scans complement each other. Therefore, when the area of the gradation is set to be different in the sub scanning direction, as illustrated in FIG. 20, the range of the gradation varies for each nozzle array. Therefore, an abrupt gradation and a gentle gradation are mixed in the image data, and both the density banding and the gloss banding can be eliminated.

In FIG. 20, a different gradation allocation pattern is set for each nozzle array of different colors. However, when a plurality of nozzle arrays for discharging the same color are formed in each head array, a gradation mask of different range length according to the second embodiment may be applied to each nozzle array of the same color in the head array with reference to FIG. 15. Further, in the configuration illustrated in FIGS. 18 and 20, a plurality of nozzle arrays has been provided for the staggered configuration illustrated in FIG. 10 of the first embodiment as a plurality of nozzle arrays in the scanning direction.

However, in the configuration in which a plurality of nozzle arrays are arranged so as to be applicable to the second embodiment, the heads may be arranged in a linear manner in the sub scanning direction as illustrated in FIG. 16, or the ends of the nozzle arrays of adjacent heads may be arranged in a stepped manner so as to overlap each other in the sub scanning direction as illustrated in FIG. 17.

In the head array, although FIGS. 18 and 20 have been described with respect to a configuration having one head in the scanning direction with the exception of overlapping portions, control of assigning a gradation pattern for each nozzle array may be applied to a head array wherein heads having a plurality of nozzle rows are arranged in a plurality of directions in the scanning direction, other than overlapping portions. For example, if a head having two rows of nozzles is provided in two rows in the scanning direction other than the overlapping part, up to four gradation patterns can be separately set for two rows of nozzles and four rows of nozzles of two heads. In addition, if at least one nozzle array out of four rows of nozzles in the head unit including the head array having a plurality of heads in the sub scanning direction is applied with a different gradation pattern, it is assumed that the second embodiment of the invention is applied.

In the first embodiment and the second embodiment, control of assigning a gradation allocation pattern to different head arrays or different nozzle rows respectively has been described for the configuration in which a plurality of heads are provided in the sub scanning direction in one head array. However, even in the configuration in which a single head is provided in the sub scanning direction in one head array, the gradation allocation control of the present invention can be applied. This example will be described below as a third embodiment.

Third Embodiment

Figure 21:
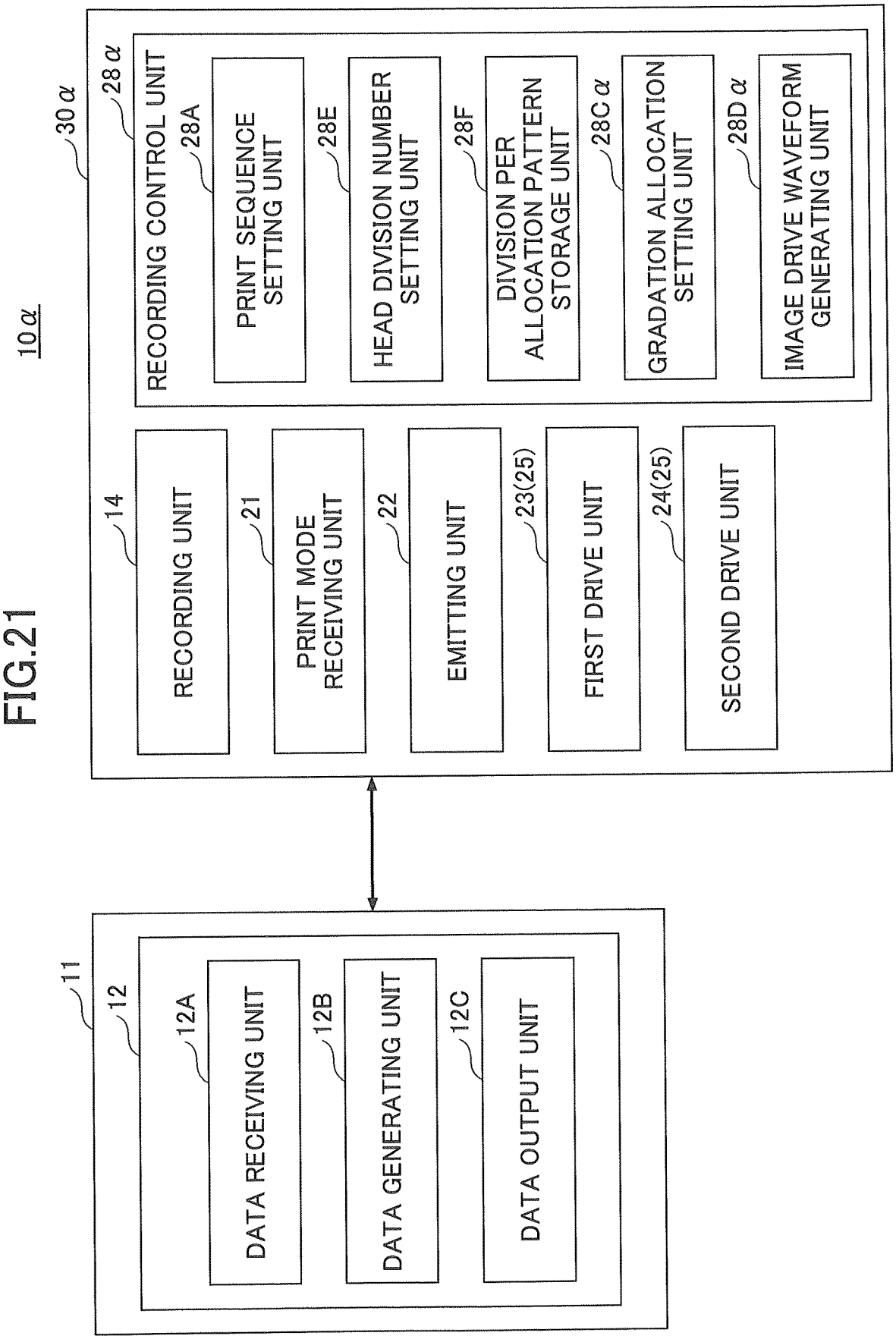
FIG. 21 is a functional block diagram of a control unit related to image processing of an image forming apparatus according to a third embodiment of the present invention.

FIG. 21 is a functional block diagram of a control unit related to image processing of an image forming apparatus according to a third embodiment of the present invention. In the head array to which the present embodiment is applied, as illustrated in FIG. 3, one head is provided in one head array in the sub scanning direction. In this embodiment, it is necessary to divide the area within one head in order to assign a gradation to a configuration of multiple head arrays in which a single head is provided. Therefore, the recording control unit 28a realizing the present embodiment includes a head division number setting unit 28E and a division per allocation pattern storage unit 28F for each division number. Specifically, the division per allocation pattern storage unit 28F stores the allocation pattern for each division number.

Figure 22:
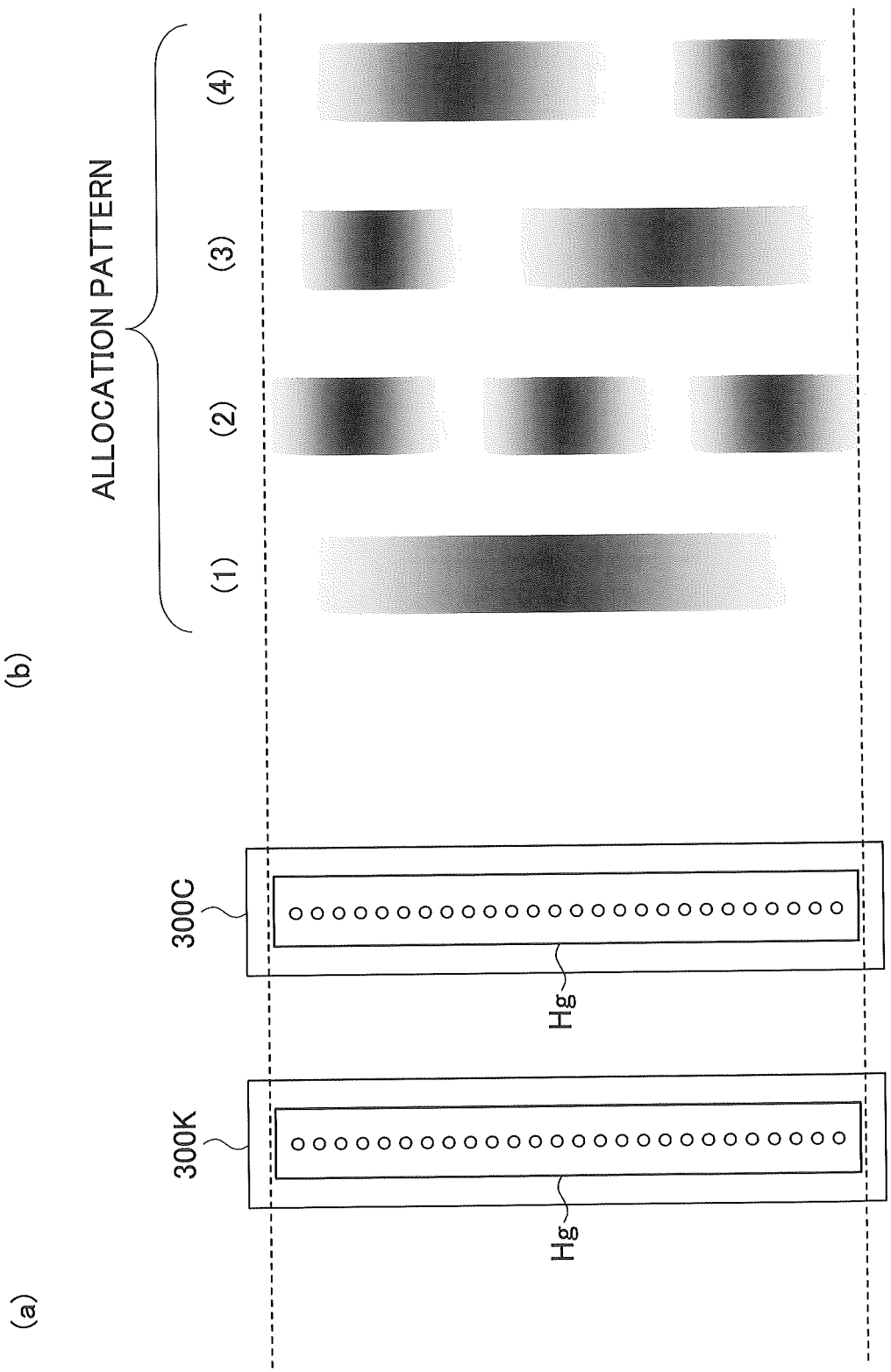
FIG. 22 illustrates an example of a group of gradation allocation patterns of the third embodiment of the present invention applied to one head array having one head disposed thereon.

For example, as illustrated in FIG. 22, when the head is divided into three types, there are four types of allocation patterns; when the head is divided into four types, there are eight types; when the head is divided into five types; when the head is divided into five, there are 16 types; and when the head is divided into six, there are 32 types.

The gradation allocation setting unit 280a according to the present exemplary embodiment sets a different gradation allocation pattern for the whole head array in the sub scanning direction in which the divided area is the minimum division unit.

In this embodiment, the head-to-head gradation allocation pattern associated with the head array may include at least a pattern (FIG. 22(b) (1)) that assigns a gradation as a single gradation allocation area across the head array, and an allocation pattern (FIG. 22(b)(2)) in which one division area in the head array is the minimum division unit. The driving waveform generating unit 28Dα for images generates driving data for each head based on image data to which a plurality of gradation masks included in the gradation allocation pattern are applied (masked). The recording unit 14 (the head drive unit) drives the head Hg based on the driving data generated by the image driving waveform generating unit 28Dα to discharge liquid from a plurality of nozzles N. FIG. 22 is a diagram illustrating an example of a group of gradation allocation patterns of a third embodiment of the present invention applied to one head array having one head disposed thereon.

Specifically, in FIG. 22, (a) is a conceptual diagram illustrating a configuration of a plurality of head arrays 300K and 300C, and (b) is a diagram illustrating an example of a group of a plurality of gradation allocation patterns that can be applied to each of the head arrays 300K and 300C, respectively.

The head arrays 300Kf and 300C correspond to one example of a first head array and a second head array, respectively.

In the third embodiment, the gradation allocation setting unit 28Cα is different from the first embodiment in the sub scanning direction from the first embodiment in that the first pattern in which one gradation is set so that the central printing rate is large and the printing ratio at both ends is small for the entire region of the head array, and the second pattern in which the gradation is set so that the central printing rate is large and the printing ratio at both ends is small for each division number in which the head array is divided.

In addition, it is common to the first embodiment that the image data is masked using the first pattern fore the first head array (e.g., 300K) included in the plurality of head arrays and the second pattern for the second head array (e.g.; 300C). In FIG. 22(b), the gradation pattern of the entire head array of FIG. 22(b) is high in bright banding and low in density banding.

Figure 23:
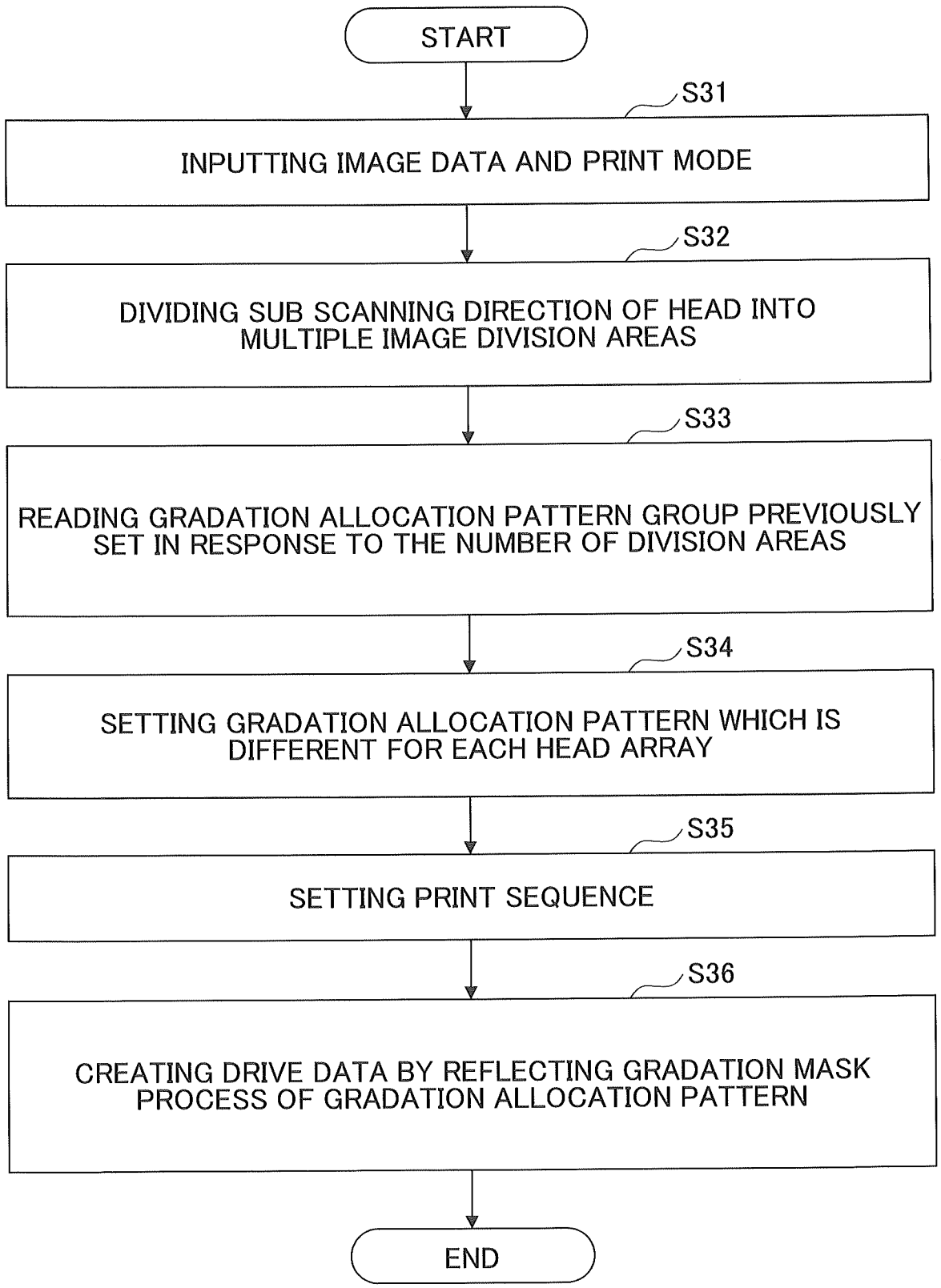
FIG. 23 is a control flow chart according to a third embodiment of the present invention.

On the other hand, the gradation pattern for each small division unit in (2) has a high suppressive effect on the density banding caused by joints and a low suppressive effect on the gloss banding. Therefore, in this control, a first pattern (gradation pattern) is set for one head (head array), and a second pattern (gradation pattern) different from the first pattern is selected and assigned to the other head (head array) from (1) to (4) in FIG. 22(b). Here, in order to prevent gloss banding, it is preferable that at least one of the masks include the gradation allocation pattern of (1) illustrated in FIG. 22(b). Therefore, it is preferable that, for example, the gradation pattern of (1) in FIG. 22(b) is selected as the first pattern, and the gradation pattern of (2), (3), or (4) in FIG. 22(b) is selected as the second pattern and set for each nozzle array. FIG. 23 is a control flow chart according to a third embodiment of the present invention. In this control, in order to divide the head and set the area, the print mode is input and the sub scanning direction of the head is divided into a plurality of separate areas in S32. Then, in S33, the group of the gradation allocation pattern that is preset according to the number of divisions is read.

Figure 24:
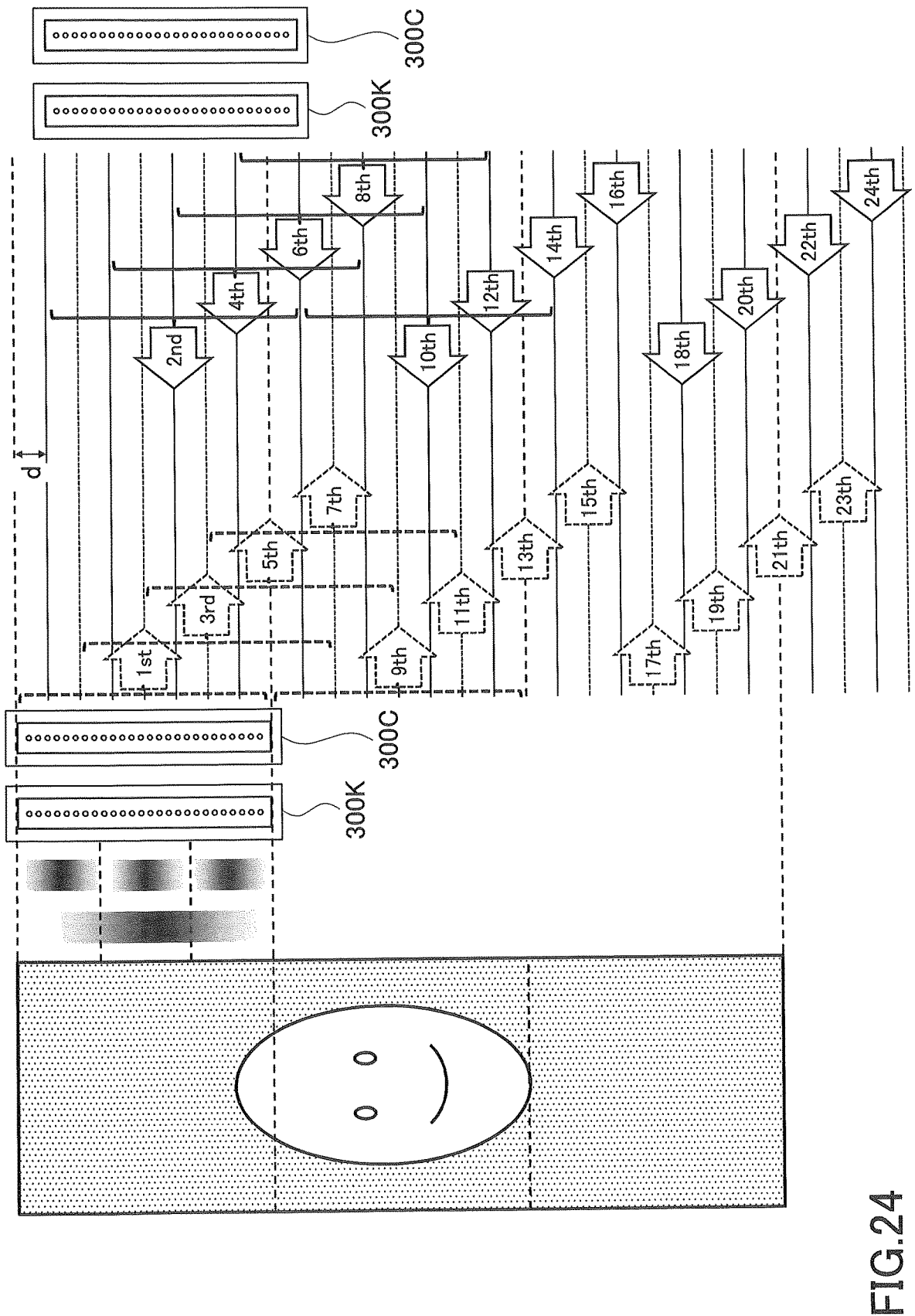
FIG. 24 is an explanatory view illustrating an example of applying a gradation allocation pattern according to a third embodiment to a head array of different colors when an image is formed by scanning one image area eight times.

In the first embodiment, as illustrated in FIGS. 11 and 12, a group of allocated patterns used in the number of heads in the sub scanning direction is determined. However, in the present embodiment, the group of allocated patterns used is determined by dividing one head (the head array) in the sub scanning direction. Thereafter, in the same process as in the first embodiment, the head array is assigned a different gradation pattern in S34, the printing sequence is set in S35, and the gradation allocation pattern is reflected in the gradation mask processing in S36 to create the driving data. As described above, when assigning a gradation allocation pattern to an image formed by a multipath interlace, it is preferable to set the gradation allocation pattern immediately after the image data is input, apply the gradation masks included in the pattern, and then allocate the image data for each scan to each division area. FIG. 24 is an explanatory diagram illustrating an example in which, when an image is formed by scanning one image area eight times, a gradation allocation pattern according to the third embodiment is applied to each head array of different colors.

Even in the present embodiment, in the multipath interlacing, the image data is divided into blocks according to the number of passes in the sub scanning direction of the scanning area of the head in order to cause each image area to be scanned while each path is repeated, and the images are formed by complementing each other so that multiple passes overlap each other.

Accordingly, the overlapping portions of the paths for forming one image are allocated (separated) for each head array of image data for forming one image so that images formed by other scans complement each other.

Therefore, as illustrated in FIG. 24, the area of the gradation is set to be different in the sub scanning direction, and the range of the gradation varies for each head array. Therefore, the steep gradation and the gentle gradation are mixed in the image data, and both the density banding and the gloss banding, which are likely to occur in the solid coating, particularly in the black, can be eliminated. In FIG. 24, an example in which a different gradation allocation pattern is set for the head arrays 300K and 300C of different colors has been described. However, even in a configuration in which the head array for discharging the same color is provided in each head array, a gradation mask of different range length according to the third embodiment in which the head is divided and set may be applied to the head array of the same color.

Fourth Embodiment

Figure 25:
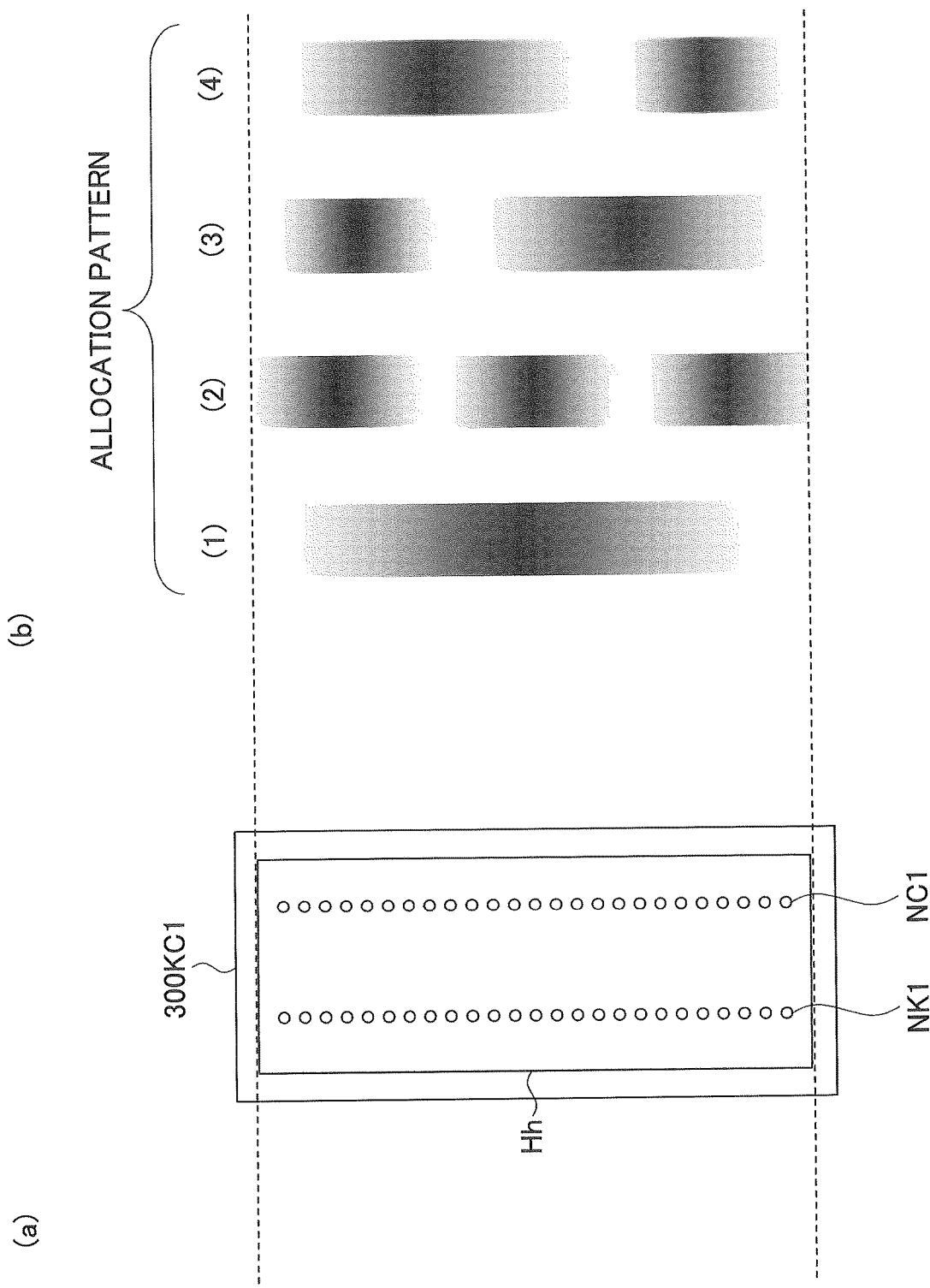
FIG. 25 illustrates an example of a group of gradation allocation patterns according to a fourth embodiment of the present invention applied to one head array having one head disposed thereon.

FIG. 25 illustrates an example of a group of gradation allocation patterns of the fourth embodiment of the present invention applied to one head array having one head disposed thereon.

Specifically, in FIG. 25, (a) is a conceptual diagram illustrating a configuration of a plurality of nozzle rows NK1 and NC1 of the head Hh provided in the head array 300 KC1, and (b) is a diagram illustrating an example of a plurality of groups of gradation allocation patterns that can be respectively applied to a plurality of nozzle rows NK1 and NC1 of the head Hh of each head array 300 KC1.

Nozzle rows NK1 and NC1 correspond to one example of a first nozzle row and a second nozzle row, respectively. In FIG. 25(b), the gradation pattern of the entire head array of (b) is highly effective in suppressing bright banding and low in suppressing density banding.

On the other hand, the gradation pattern for each small division unit in (2) has a high suppressive effect on the density banding caused by joints and a low suppressive effect on the gloss banding.

Therefore, in this control, a first pattern (gradient) is set for one nozzle array, and a second pattern (gradation pattern) different from the first pattern is selected from (1) to (4) in FIG. 25(b) to set the other nozzle array. Here, it is preferable to include at least one gradation allocation pattern of (1) illustrated in FIG. 25(b) in order to prevent gloss banding. Therefore, for example, it is preferable that the gradation pattern of (1) in FIG. 25(b) be selected as the first pattern, and the gradation pattern of (2), (3), or (4) in FIG. 25(b) be selected as the second pattern and set for each nozzle array. A configuration for executing the fourth embodiment is common to a functional block diagram of FIG. 21 for executing the third embodiment.

Figure 26:
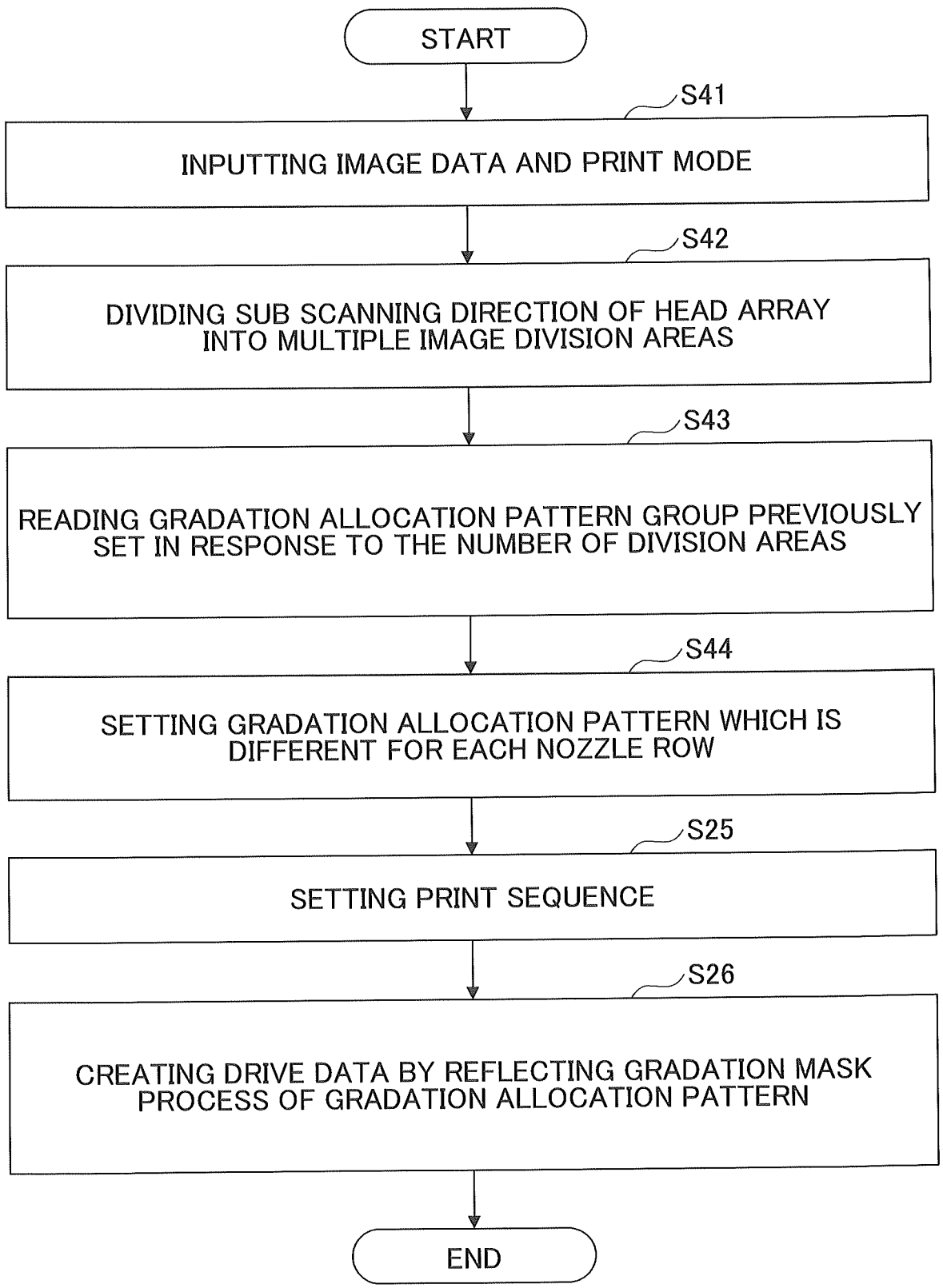
FIG. 26 is a control flow chart according to a fourth embodiment of the present invention.
Figure 27:
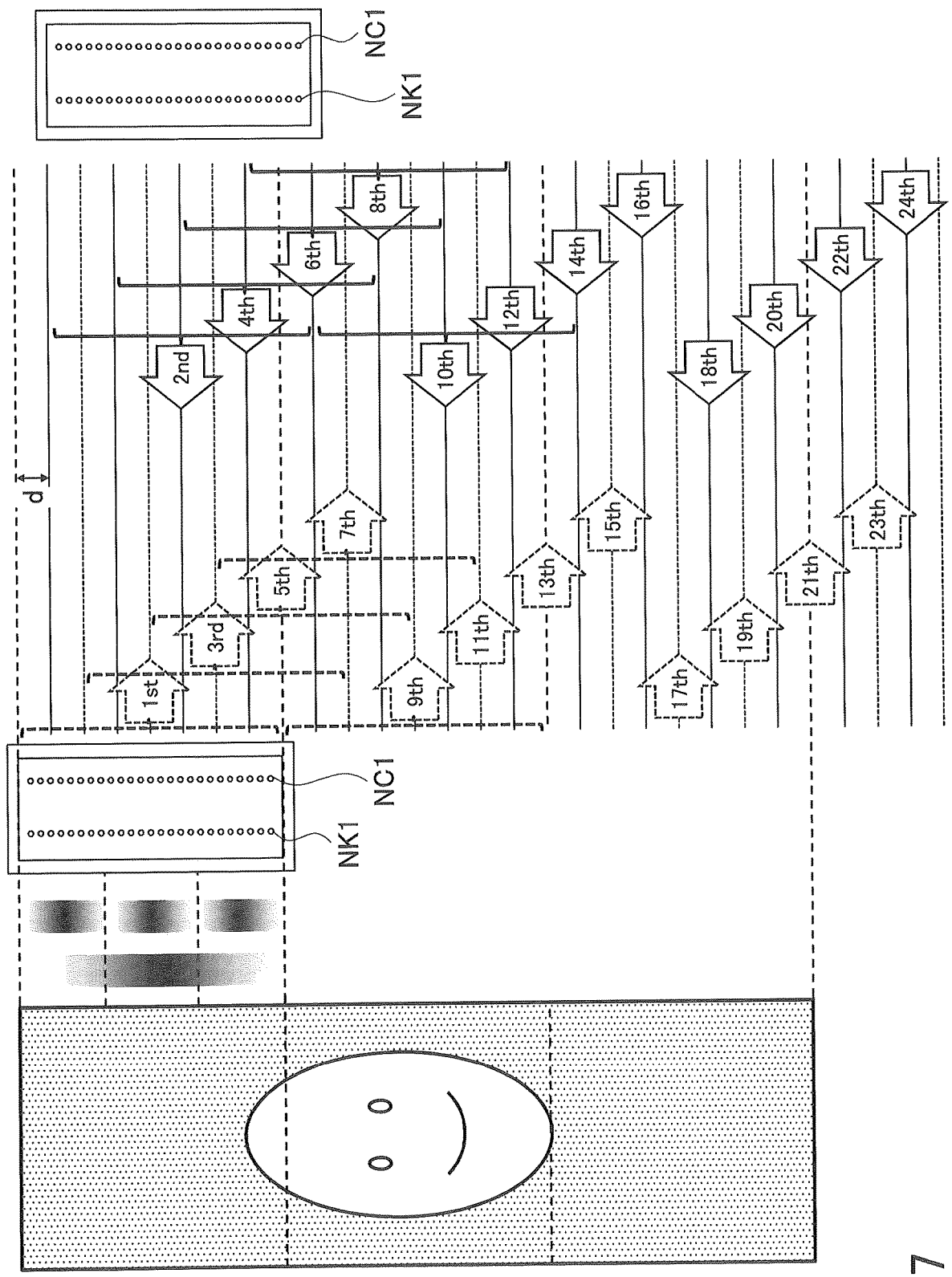
FIG. 27 is an explanatory view illustrating an example in which, when an image is formed by scanning one image area eight times, a gradation allocation pattern according to the fourth embodiment is applied to each nozzle array of different colors.

FIG. 26 is a control flow chart according to a fourth embodiment of the present invention. This control is substantially equivalent to the third embodiment, but differs in that a gradation pattern is assigned to each nozzle array in S44. FIG. 27 is an explanatory diagram illustrating an example in which when an image is formed by scanning one image area eight times, a gradation allocation pattern according to the fourth embodiment is applied to each nozzle array of different colors.

Even in the present embodiment, in the multipath interlacing, the image data is divided into blocks according to the number of passes in the sub scanning direction of the scanning area of the head in order to cause each image area to be scanned while each path is repeated, and the images are formed by complementing each other so that multiple passes overlap each other. Therefore, the overlapping portions of the paths for forming one image are allocated (separated) for each nozzle array of image data for forming one image so that the images formed by the other scans complement each other. Accordingly, as illustrated in FIG. 27, by setting the area of the gradation differently in the sub scanning direction, the range of the gradation varies for each nozzle array, so that a steep gradation and a gentle gradation are mixed in the image data, and both the density banding and the gloss banding, which are likely to occur in solid-coated black in particular, can be eliminated.

In FIG. 27, a different gradation allocation pattern is set for each nozzle array of different colors. However, when a plurality of nozzle arrays for discharging the same color are formed in each head array, a different gradation allocation pattern may be set for each head array of the same color in which the division area is the minimum division unit for the entire area of the head array. Although FIGS. 25 and 27 have been described in the head array in terms of a configuration having one head in the scanning direction, control of assigning a gradation pattern to the nozzle array may be applied to the head array in which the heads having a plurality of nozzle arrays are arranged in the scanning direction. For example, if a head having two rows of nozzles is provided in two rows in the scanning direction, up to four gradation patterns can be separately set for two rows of nozzles and four rows of two head groups. In addition, if at least one nozzle row out of four rows of nozzles in the head unit including the head array having one head in the sub scanning direction is applied with a different gradation pattern, it is assumed that the fourth embodiment of the present invention is applied.

Effects of the Invention

According to one embodiment, the banding on the recording medium can be suppressed in the liquid discharge apparatus.

While the preferred embodiment of the invention has been described in detail above, the invention is not limited to the particular embodiment, and various variations and modifications are possible within the scope of the spirit of the embodiments of the invention as defined in the appended claims.

Explanation of Numerical References

14: Recording unit (head drive unit)
28A: Print sequence setting unit
28B: Allocation pattern storage unit
28C, 28Cα: Gradation allocation setting unit
28D: Image drive waveform generating unit (mask processing unit)
28E: Head division number setting unit
28F: Division per allocation pattern storage unit
101: Recording medium
200: Carriage
300, 300a: Image forming unit (head unit)
300K, 300C, 300M, 300Y, 300CL, 300W: Head (head part, first head part, second head part)
300 Ka, 300 Ca, 300 Ma, 300 Ya, 300 CLa, 300 Wa: Head array (first head array, second head array)
300Kb, 300Cb, 300 Mb, 300Yb, 300CLb, 300Wb: Head Array (first head array, second head array)
400: Emitting unit
H1, H2, H3, H4: Head (head)
Ha, Hb, Hc: Head
X: Second direction (main scanning direction)
Y: First direction (sub scanning direction, nozzle row direction)
N: Nozzle train

What is claimed is:

1. A liquid discharging apparatus comprising:
a head unit that includes a plurality of head arrays each having a nozzle row, in which a plurality of nozzles discharging liquid onto a recording medium are arranged in a sub scanning direction, the plurality of head arrays being arranged in a main scanning direction perpendicular to the sub scanning direction;
a moving unit that alternately performs a main scanning operation and a sub scanning operation, the main scanning operation causing the head unit to move in the main scanning direction while discharging the liquid onto the recording medium while discharging the liquid, the sub scanning operation causing the head unit or the recording medium to move in the sub scanning direction relative to the recording medium or the head unit without discharging the liquid; and
a gradation allocation setting unit that sets a first pattern and a second pattern, the first pattern setting a gradation to increase a center printing ratio at a center and decrease an end printing ratio at both ends for a whole area of the head array in the sub scanning direction, the second pattern in which a gradation is set so as to increase the printing ratio setting a gradation to increase the center printing ratio and decrease the end printing ratio for an arbitrary number of the heads;
a masking unit that masks image data using the first pattern for a first head array included in the plurality of head arrays and a second pattern for the second head array included in the plurality of head arrays; and
a head drive unit that discharges the liquid from the plurality of nozzles based on the masked image data.

2. The liquid discharging apparatus according to claim 1, wherein, in the second pattern, one gradation is set for each head.

3. The liquid discharging apparatus according to claim 1, wherein, in the second pattern, one gradation is set for the plurality of heads.

4. The liquid discharging apparatus according to claim 1, wherein the second pattern includes an area in which the gradation is set to a unit of a first number of the heads and an area in which the gradation is set to a unit of a second number of the heads different from the first number of the heads.

5. The liquid discharging apparatus according to claim 1, wherein the liquid discharged from the first and second head arrays is different in color.

6. The liquid discharging apparatus according to claim 1, wherein the liquid discharged from the first and second head arrays has a same color.

7. The liquid discharge apparatus according to claim 1, wherein three or more heads are provided in the head array, and
wherein positions of the heads adjacent in the sub scanning direction are different in the main scanning direction, and end portions of the nozzle rows of the heads adjacent in the sub scanning direction are arranged to overlap with each other in the sub scanning direction.

8. The liquid discharge apparatus according to claim 1, wherein the plurality of heads of the head arrays are arranged in linear array in the sub scanning direction.

9. A method for discharging liquid for the liquid discharging apparatus including
a head unit that includes a plurality of head arrays each having a nozzle row, in which a plurality of nozzles discharging liquid onto a recording medium are arranged in a sub scanning direction, the plurality of head arrays being arranged in a main scanning direction perpendicular to the sub scanning direction, and
a moving unit that alternately performs a main scanning operation and a sub scanning operation, the main scanning operation causing the head unit to move in the main scanning direction while discharging the liquid onto the recording medium while discharging the liquid, the sub scanning operation causing the head unit or the recording medium to move in the sub scanning direction relative to the recording medium or the head unit without discharging the liquid, the method comprising:
a gradation allocation setting step that sets a first pattern and a second pattern, the first pattern setting a gradation to increase a center printing ratio at a center and decrease an end printing ratio at both ends for a whole area of the head array in the sub scanning direction, the second pattern in which a gradation is set so as to increase the printing ratio setting a gradation to increase the center printing ratio and decrease the end printing ratio for an arbitrary number of the heads;
a masking step that masks image data using the first pattern for a first head array included in the plurality of head arrays and a second pattern for the second head array included in the plurality of head arrays; and
a head drive step that discharges the liquid from the plurality of nozzles based on the masked image data.

10. A non-transitory computer-readable storage medium storing a program for discharging liquid for a liquid discharging apparatus including
a head unit that includes a plurality of head arrays each having a nozzle row, in which a plurality of nozzles discharging liquid onto a recording medium are arranged in a sub scanning direction, the plurality of head arrays being arranged in a main scanning direction perpendicular to the sub scanning direction, and
a moving unit that alternately performs a main scanning operation and a sub scanning operation, the main scanning operation causing the head unit to move in the main scanning direction while discharging the liquid onto the recording medium while discharging the liquid, the sub scanning operation causing the head unit or the recording medium to move in the sub scanning direction relative to the recording medium or the head unit without discharging the liquid, the program causing a computer to implement:
a gradation allocation setting step that sets a first pattern and a second pattern, the first pattern setting a gradation to increase a center printing ratio at a center and decrease a end printing ratio at both ends for a whole area of the head array in the sub scanning direction, the second pattern in which a gradation is set so as to increase the printing ratio setting a gradation to increase the center printing ratio and decrease the end printing ratio for an arbitrary number of the heads;
a masking step that masks image data using the first pattern for a first head array included in the plurality of head arrays and a second pattern for the second head array included in the plurality of head arrays; and
a head drive step that discharges the liquid from the plurality of nozzles based on the masked image data.

* * * * *